(12) United States Patent  
Chaahoub et al.

(10) Patent No.: US 9,236,946 B2
(45) Date of Patent: Jan. 12, 2016

(54) METHOD AND APPARATUS FOR PERFORMING DATA RATE CONVERSION AND PHASE ALIGNMENT

(71) Applicant: Avago Technologies General IP (Singapore) Pte. Ltd., Singapore (SG)

(72) Inventors: Faouzi Chaahoub, San Jose, CA (US); Georgios Asmanis, Lake Forest, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 112 days.

(21) Appl. No.: 13/966,602

(22) Filed: Aug. 14, 2013

(65) Prior Publication Data

US 2014/0348512 A1 Nov. 27, 2014

Related U.S. Application Data

(63) Continuation-in-part of application No. 13/460,833, filed on Apr. 30, 2012, and a continuation-in-part of application No. 13/544,199, filed on Jul. 9, 2012.

(51) Int. Cl.
*H04B 10/00* (2013.01)
*H04B 10/40* (2013.01)
*H04B 10/25* (2013.01)
*H04B 10/80* (2013.01)

(52) U.S. Cl.
CPC ............... *H04B 10/40* (2013.01); *H04B 10/25* (2013.01); *H04B 10/801* (2013.01)

(58) Field of Classification Search
USPC .................................................. 398/182, 43
See application file for complete search history.

(56) References Cited

U.S. PATENT DOCUMENTS

| | | | |
|---|---|---|---|
| 6,625,241 B2 * | 9/2003 | Mejia | 375/372 |
| 6,665,498 B1 * | 12/2003 | Jiang et al. | 398/135 |
| 6,850,663 B2 * | 2/2005 | Kikuchi et al. | 385/24 |
| 6,932,618 B1 | 8/2005 | Nelson | |
| 6,947,672 B2 * | 9/2005 | Jiang et al. | 398/135 |
| 6,982,879 B1 | 1/2006 | Franca-Neto et al. | |
| 7,050,468 B2 * | 5/2006 | Seto et al. | 370/535 |
| 7,380,993 B2 * | 6/2008 | Dallesasse | 385/89 |

(Continued)

FOREIGN PATENT DOCUMENTS

CN 1529955 A 9/2004

OTHER PUBLICATIONS

Dan Dove, Kapil Shrikhande, Pete Anslow, Jonathan King, Ryan Latchman, Next Generation 100 Gigabit Optical Ethernet, Powerpoint Presentation, Jul. 2011, p. 1-33, IEEE, San Francisco, United States.

(Continued)

*Primary Examiner* — Agustin Bello

(57) ABSTRACT

A gearbox IC is incorporated into an optical communications system to enable an optical link that incorporates the system to achieve data rates that are at least double that which are currently achievable in optical links. The gearbox IC is compatible with ASIC designs currently used in optical fiber links. The gearbox IC enables the data rate of the optical fiber link to be dramatically increased without requiring a redesign of the ASIC that is currently used in the optical fiber link. The gearbox IC performs data rate conversion and phase alignment for bit streams being transferred via the gearbox IC between the ASIC and an optical transceiver module of the optical communications system.

43 Claims, 8 Drawing Sheets

(56) References Cited

U.S. PATENT DOCUMENTS

| | | | |
|---|---|---|---|
| 7,539,366 B1 | 5/2009 | Baks et al. | |
| 7,729,581 B2 | 6/2010 | Rolston et al. | |
| 7,783,206 B2 | 8/2010 | Reyna et al. | |
| 7,835,648 B2* | 11/2010 | Hofmeister et al. | 398/136 |
| 7,860,400 B2* | 12/2010 | Cole | 398/155 |
| 8,078,058 B2* | 12/2011 | Zhang et al. | 398/99 |
| 8,223,768 B2* | 7/2012 | Handelman | 370/391 |
| 8,340,123 B2* | 12/2012 | Barbieri et al. | 370/466 |
| 8,382,384 B2 | 2/2013 | Nekado et al. | |
| 8,433,202 B2* | 4/2013 | Way | 398/158 |
| 8,666,257 B2* | 3/2014 | Daghighian et al. | 398/138 |
| 2003/0053768 A1 | 3/2003 | Brezina et al. | |
| 2004/0028164 A1* | 2/2004 | Jiang et al. | 375/371 |
| 2005/0084269 A1* | 4/2005 | Dallesasse et al. | 398/135 |
| 2005/0156310 A1 | 7/2005 | Benner et al. | |
| 2008/0095541 A1* | 4/2008 | Dallesasse | 398/191 |
| 2008/0107422 A1 | 5/2008 | Cole | |
| 2008/0205437 A1* | 8/2008 | Cole | 370/464 |
| 2008/0240648 A1 | 10/2008 | Im | |
| 2008/0292322 A1* | 11/2008 | Daghighian et al. | 398/192 |
| 2009/0317086 A1 | 12/2009 | Morohashi et al. | |
| 2010/0008679 A1* | 1/2010 | Cole et al. | 398/185 |
| 2010/0021166 A1* | 1/2010 | Way | 398/79 |
| 2010/0054733 A1 | 3/2010 | Hosking | |
| 2010/0266236 A1 | 10/2010 | Meadowcroft et al. | |
| 2010/0272440 A1* | 10/2010 | Haran et al. | 398/67 |
| 2011/0026888 A1 | 2/2011 | Nekado et al. | |
| 2011/0195589 A1 | 8/2011 | Takahashi | |
| 2012/0170927 A1* | 7/2012 | Huang et al. | 398/20 |
| 2013/0259478 A1* | 10/2013 | Komaki | 398/58 |
| 2013/0287394 A1* | 10/2013 | Chaahoub et al. | 398/43 |
| 2014/0010546 A1* | 1/2014 | Chaahoub et al. | 398/116 |

OTHER PUBLICATIONS

Chris Cole, MLG (Multi-Link Gearbox) Project Start Proposal, Powerpoint Presentation, Jul. 8, 2011, p. 1-13, Optical Internetworking Forum, Fremont, United States.

Steve Gabriel, Gary Beauchamp, Gennum and Altera Demonstrate 4×25Gb/s ICs for Next-Generation 100Gb/s Networks, Press Release, Sep. 19, 2011, p. 1, Altera Corporation, San Jose, United States.

Harpinder S. Matharu, 100G Dual Gearbox: Improving Port Density on Line Cards in Core Network Equipment, White Paper: Virtex-7 HT FPGAs, Mar. 1, 2012, p. 1-10, vol. 1, Xilinx, San Jose, United States.

Kromer, Christian et al., "A 100-mW 4×10 Gb/s Transceiver in 80-nm CMOS for High-Density Optical Interconnects", *IEEE Journal of Solid-State Circuits*, vol. 40, No. 12 Dec. 2005, 2667-2679.

* cited by examiner

US 9,236,946 B2

METHOD AND APPARATUS FOR PERFORMING DATA RATE CONVERSION AND PHASE ALIGNMENT

CROSS-REFERENCE TO RELATED APPLICATIONS

This application is a continuation-in-part application (CIP) of U.S. application Ser. No. 13/460,833, filed on Apr. 30, 2012, entitled "A HIGH-SPEED OPTICAL FIBER LINK AND A METHOD FOR COMMUNICATING OPTICAL DATA SIGNALS," and is a CIP of U.S. application Ser. No. 13/544,199, filed on Jul. 9, 2012, entitled "METHOD AND APPARATUS FOR PERFORMING DATA RATE CONVERSION AND PHASE ALIGNMENT," both of which are currently pending and both of which are incorporated by reference herein in their entireties.

TECHNICAL FIELD OF THE INVENTION

The invention relates to optical communications networks over which data is communicated in the form of optical signals transmitted and received over optical waveguides.

BACKGROUND OF THE INVENTION

In optical communications networks, optical transceiver modules are used to transmit and receive optical signals over optical fibers. An optical transceiver module generates modulated optical signals that represent data, which are then transmitted over an optical fiber coupled to the transceiver module. Each transceiver module includes a transmitter side and a receiver side. On the transmitter side, a laser light source generates laser light and an optical coupling system receives the laser light and optically couples the light onto an end of an optical fiber. The laser light source typically is made up of one or more laser diodes that generate light of a particular wavelength or wavelength range. The optical coupling system typically includes one or more reflective elements, one or more refractive elements and/or one or more diffractive elements. On the receiver side, a photodiode detects an optical data signal transmitted over an optical fiber and converts the optical data signal into an electrical signal, which is then amplified and processed by electrical circuitry of the receiver side to recover the data. The combination of the optical transceiver modules connected on each end of the optical fiber and the optical fiber itself is commonly referred to as an optical fiber link.

In switching systems that are commonly used in optical communications networks, each optical transceiver module is typically mounted on a circuit board that is interconnected with another circuit board that is part of a backplane of the switching system. The backplane typically includes many circuit boards that are electrically interconnected with one another. In many such switching systems, each circuit board of the backplane has an application specific integrated circuit (ASIC) mounted on it and electrically connected to it. Each ASIC is electrically interconnected with a respective optical transceiver module via electrically-conductive traces of the respective circuit boards. In the transmit direction, each ASIC communicates electrical data signals to its respective optical transceiver module, which then converts the electrical data signals into respective optical data signals for transmission over the optical fibers that are connected to the optical transceiver module. In the receive direction, the optical transceiver module receives optical data signals coupled into the module from respective optical fibers connected to the module and converts the respective optical data signals into respective electrical data signals. The electrical data signals are then output from the module and are received at respective inputs of the ASIC, which then processes the electrical data signals. The electrical interconnections on the circuit boards that connect inputs and outputs of each ASIC to outputs and inputs, respectively, of each respective optical transceiver module are typically referred to as lanes.

FIG. 1 illustrates a block diagram of a known optical communications system 2 of a known switching system. The optical communications system 2 comprises a first circuit board 3, an optical transceiver module 4 mounted on the first circuit board 3, a backplane circuit board 5, and an ASIC 6 mounted on the backplane circuit board 5. Four output optical fibers 7 and four input optical fibers 8 are connected to the optical transceiver module 4. In the transmit direction, the ASIC 6 produces four 25 gigabit per second (Gbps) electrical data signals, which are output from the ASIC 6 onto four respective output lanes 9 to the optical transceiver module 4. The optical transceiver module 4 then converts the four 25 Gbps electrical data signals into four respective 25 Gbps optical data signals and couples them into the ends of four respective optical fibers 7 for transmission over the optical fiber link. In the receive direction, four 25 Gbps optical data signals are coupled from the ends of four respective optical fibers 8 into the optical transceiver module 4, which then converts the optical data signals into four 25 Gbps electrical data signals. The four 25 Gbps electrical data signals are then output over four respective input lanes 11 to four respective inputs of the ASIC 6 for processing by the ASIC 6. Thus, the optical fiber link has a data rate of 100 Gbps in the transmit direction and 100 Gbps in the receive direction. The data rate of the optical fiber link can be increased by increasing the number of optical transceiver modules 4 and ASICs 6 that are included in the link. For example, if four optical transceiver modules 4 and four ASICs 6 are included in the optical communications system 2, the optical fiber link will have a data rate of 400 Gbps in the transmit direction and 400 Gbps in the receive direction.

Ever-increasing demands for greater bandwidth often lead to efforts to upgrade optical fiber links to achieve higher data rates. Doing so, however, typically requires either duplicating the number of optical transceiver modules and ASICs that are used in the optical communications system or replacing the optical transceiver modules and ASICs with optical transceivers and ASICs that operate at higher data rates. Of course, duplicating the number of optical transceiver modules and ASICs that are used in the optical communications system is a very costly solution. Therefore, it would be desirable to provide a way to substantially increase the bandwidth of an optical fiber link without having to duplicate the number of optical transceiver modules and ASICs that are employed. In order to replace the ASICs with ASICs that operate at higher data rates, the ASIC would have to be redesigned, which is also a very costly solution.

Accordingly, it would be desirable to provide a way to upgrade an optical fiber link to achieve substantially higher data rates without having to duplicate the number of optical transceiver modules and ASICs that are employed in the optical communications system and without having to redesign the ASIC.

SUMMARY OF THE INVENTION

The invention is directed to methods and apparatuses for performing data rate conversion and phase alignment, and optical communications systems that incorporate the methods and apparatuses. The apparatuses are gearbox ICs having various configurations for performing data rate conversion and phase alignment. In accordance with one embodiment, the gearbox IC comprises a first electrical interface, phase-alignment circuitry, first rate conversion circuitry, a second electrical interface, and second rate conversion circuitry.

The first electrical interface has N input terminals for inputting N electrical data signals having a data rate of X Gbps and N output terminals for outputting N electrical data signals having a data rate of X Gbps, where N is a positive integer that is equal to or greater than 2 and X is a positive number that is equal to or greater than 25. The phase-alignment circuitry phase-aligns pairs of the N inputted electrical data signals to produce N/2 pairs of phase-aligned electrical data signals. The first rate conversion circuitry receives the N/2 phase-aligned pairs of electrical data signals and converts each of the N/2 phase-aligned pairs into a serialized electrical data signal having a data rate of 2X Gbps. The second electrical interface has N/2 output terminals and N/2 input terminals. The serialized 2X Gbps electrical data signals are outputted from the gearbox IC via the N/2 output terminals of the second electrical interface. The second rate conversion circuitry receives N/2 electrical data signals having a data rate of 2X Gbps that are inputted to the gearbox IC via the N/2 input terminals of the second electrical interface and converts the N/2 2X Gbps electrical data signals into N electrical data signals having a data rate of X Gbps, which are outputted from the gearbox IC via the N output terminals of the first electrical interface.

In accordance with another embodiment, the gearbox IC comprises a first electrical interface, phase-alignment circuitry, pulse amplitude modulation (PAM) encoding circuitry, a second electrical interface, and PAM decoding circuitry. The first electrical interface has N input terminals for inputting N binary electrical data signals having a data rate of X Gbps and N output terminals for outputting N binary electrical data signals having a data rate of X Gbps, where N is a positive integer that is equal to or greater than 2 and X is a positive number that is equal to or greater than 25. The phase-alignment circuitry phase-aligns pairs of the N inputted binary electrical data signals to produce N/2 pairs of phase-aligned binary electrical data signals. The PAM encoding circuitry receives the N/2 phase-aligned pairs of binary electrical data signals, encodes each of the N/2 phase-aligned pairs into a respective serial PAM-encoded electrical data signal having a data rate of X Gbps, and outputs N/2 X Gbps serial PAM-encoded electrical data signals. The second electrical interface has N/2 output terminals and N/2 input terminals, and the N/2 X Gbps serial PAM-encoded electrical data signals are outputted from the gearbox IC via the respective N/2 output terminals of the second electrical interface.

The PAM decoding circuitry receives N/2 X Gbps serial PAM-encoded electrical data signals that are inputted to the gearbox IC via the N/2 input terminals, respectively, of the second electrical interface, decodes the inputted N/2 X Gbps serial PAM-encoded electrical data signals into N X Gbps serial binary electrical data signals, and outputs the N X Gbps serial binary electrical data signals from the PAM decoding circuitry. The N X Gbps serial binary electrical data signals are outputted from the gearbox IC via the N output terminals, respectively, of the first electrical interface.

In accordance with one embodiment, the method comprises the following. In a first electrical interface of the gearbox IC, N electrical data signals having a data rate of X Gbps are inputted into the gearbox IC via respective input terminals of a first electrical interface of the gearbox IC, where N is a positive integer that is equal to or greater than 2 and X is a positive number that is equal to or greater than 25. In phase-alignment circuitry of the gearbox IC, pairs of the N inputted electrical data signals are phase-aligned to produce N/2 pairs of phase-aligned electrical data signals. In first rate conversion circuitry of the gearbox IC, N/2 phase-aligned pairs of electrical data signals are received from the phase-alignment circuitry and converted into respective serialized electrical data signals having a data rate of 2X Gbps. From a second electrical interface of the gearbox IC, N/2 serialized 2X Gbps electrical data signals are outputted from the gearbox IC via the N/2 respective output terminals of the second electrical interface. In second rate conversion circuitry of the gearbox IC, N/2 2X Gbps electrical data signals are inputted to the gearbox IC via the N/2 respective input terminals of the second electrical interface and converted into N X Gbps electrical data signals having a data rate of X Gbps. The N X Gbps electrical data signals are then outputted from the gearbox IC via the N output terminals, respectively, of the first electrical interface.

In accordance with another embodiment, the method comprises the following. In a first electrical interface of the gearbox IC, N electrical data signals having a data rate of X gigabits Gbps are inputted into the gearbox IC via respective input terminals of a first electrical interface of the gearbox IC, where N is a positive integer that is equal to or greater than 2 and X is a positive number that is equal to or greater than 25. With phase-alignment circuitry of the gearbox IC, pairs of the N inputted electrical data signals are phase aligned to produce N/2 pairs of phase-aligned electrical data signals. In PAM encoding circuitry of the gearbox IC, the N/2 phase-aligned pairs of binary electrical data signals are received, encoded into respective serial PAM-encoded electrical data signals having a data rate of X Gbps, and outputted from the PAM encoding circuitry.

In a second electrical interface of the gearbox IC, the N/2 X Gbps serial PAM-encoded electrical data signals outputted from the PAM encoding circuitry are received and outputted from the gearbox IC via N/2 respective output terminals of the second electrical interface of the gearbox IC. In PAM decoding circuitry of the gearbox IC, N/2 X Gbps serial PAM-encoded electrical data signals are received via N/2 respective input terminals of the second electrical interface of the gearbox IC, decoded into N X Gbps serial binary electrical data signals, and outputted from the PAM decoding circuitry. The N X Gbps serial binary electrical data signals outputted from PAM decoding circuitry are outputted from the gearbox IC via N respective output terminals of the first electrical interface.

In accordance with one embodiment of the optical communications system, the system comprises an ASIC, a gearbox IC, and an optical transceiver module. The ASIC outputs N electrical data signals having a data rate of X Gbps from a first set of output terminals of the ASIC, where N is a positive integer that is equal to or greater than 2 and where X is a positive number that is equal to or greater than 25. The gearbox IC inputs, via a first set of input terminals of the gearbox IC, the N X Gbps electrical data signals outputted from the ASIC and converts them into N/2 electrical data signals having a data rate of 2X Gbps. The N/2 2X Gbps electrical data signals are outputted from the gearbox IC via a first set of output terminals of the gearbox IC. The optical transceiver module receives the N/2 2X Gbps electrical data signals output from the first set of output terminals of the first gearbox IC and causes N/2 electrical-to-optical conversion (EOC) elements of the transceiver module to produce N/2 2X Gbps optical data signals corresponding to the N/2 2X Gbps electrical data signals. An optics system of the optical transceiver module couples the respective N/2 2X Gbps optical data signals into respective ends of respective optical fibers of a plurality of optical fibers connected to the optical transceiver module.

In accordance with another embodiment of the optical communications system, the system comprises an ASIC, a gearbox IC, and an optical transceiver module the optical transceiver module. The ASIC outputs N electrical data signals having a data rate of X Gbps from a first set of output terminals of the ASIC, where N is a positive integer that is equal to or greater than 2 and where X is a positive number that is equal to or greater than 25. The gearbox IC inputs, via a first set of input terminals of the gearbox IC, the N X Gbps electrical data signals outputted from the ASIC and converts them into N/2 X Gbps serial PAM-encoded electrical data signals. The first gearbox IC outputs the N/2 X Gbps serial PAM-encoded electrical data signals from a first set of output terminals of the first gearbox IC. The optical transceiver module receives the N/2 X Gbps serial PAM-encoded electrical data signals outputted from the first set of output terminals of the first gearbox IC and causes N/2 EOC elements to produce N/2 X Gbps PAM-encoded optical data signals corresponding to the N/2 X Gbps serial PAM-encoded electrical data signals received in the optical transceiver module. An optics system of the optical transceiver module couples the respective N/2 X Gbps PAM-encoded optical data signals into respective ends of respective optical fibers of the plurality of optical fibers.

In accordance with one embodiment, a method for communicating over an optical fiber link is provided. The method comprises the following. N electrical data signals having a data rate of X Gbps are outputted from a first set of output terminals of an ASIC, where N is a positive integer that is equal to or greater than 2 and where X is a positive number that is equal to or greater than 25. The N X Gbps electrical data signals are then inputted to a gearbox IC via a first set of input terminals of the gearbox IC. The gearbox IC converts the NX Gbps electrical data signals into N/2 2X Gbps electrical data signals. The gearbox IC outputs, via a first set of output terminals of the gearbox IC, the N/2 2X Gbps electrical data signals. The N/2 2X Gbps electrical data signals are inputted into the optical transceiver module via a first set of input terminals of the optical transceiver module. With N/2 EOC elements of the optical transceiver module, the inputted N/2 2X Gbps electrical data signals are converted into N/2 2X Gbps optical data signals, respectively. With an optics system of the optical transceiver module, the N/2 2X Gbps optical data signals are coupled into respective ends of respective optical fibers of a plurality of optical fibers connected to the optical transceiver module.

In accordance with one embodiment, the method for communicating over an optical fiber link comprises the following. N electrical data signals having a data rate of X Gbps are outputted from a first set of output terminals of an ASIC, where N is a positive integer that is equal to or greater than 2 and where X is a positive number that is equal to or greater than 25. Via a first set of input terminals of a gearbox IC, the N X Gbps electrical data signals outputted from the ASIC are inputted into the gearbox IC. The N X Gbps electrical data signals are converted by the gearbox IC into N/2 X Gbps PAM-encoded electrical data signals. Via a first set of output terminals of the gearbox IC, the N/2 X Gbps PAM-encoded electrical data signals are outputted from the gearbox IC. Via a first set of input terminals of an optical transceiver module, the N/2 X Gbps PAM-encoded electrical data signals output from the gearbox IC are inputted into the optical transceiver module. With N/2 EOC elements of the optical transceiver module, the inputted N/2 X Gbps PAM-encoded electrical data signals are converted into N/2 X Gbps PAM-encoded optical data signals, respectively. With an optics system of the optical transceiver module, the N/2 X Gbps PAM-encoded optical data signals are coupled into respective ends of respective optical fibers of a plurality of optical fibers connected to the optical transceiver module.

These and other features and advantages of the invention will become apparent from the following description, drawings and claims.

DETAILED DESCRIPTION OF AN ILLUSTRATIVE EMBODIMENT

Figure 1:
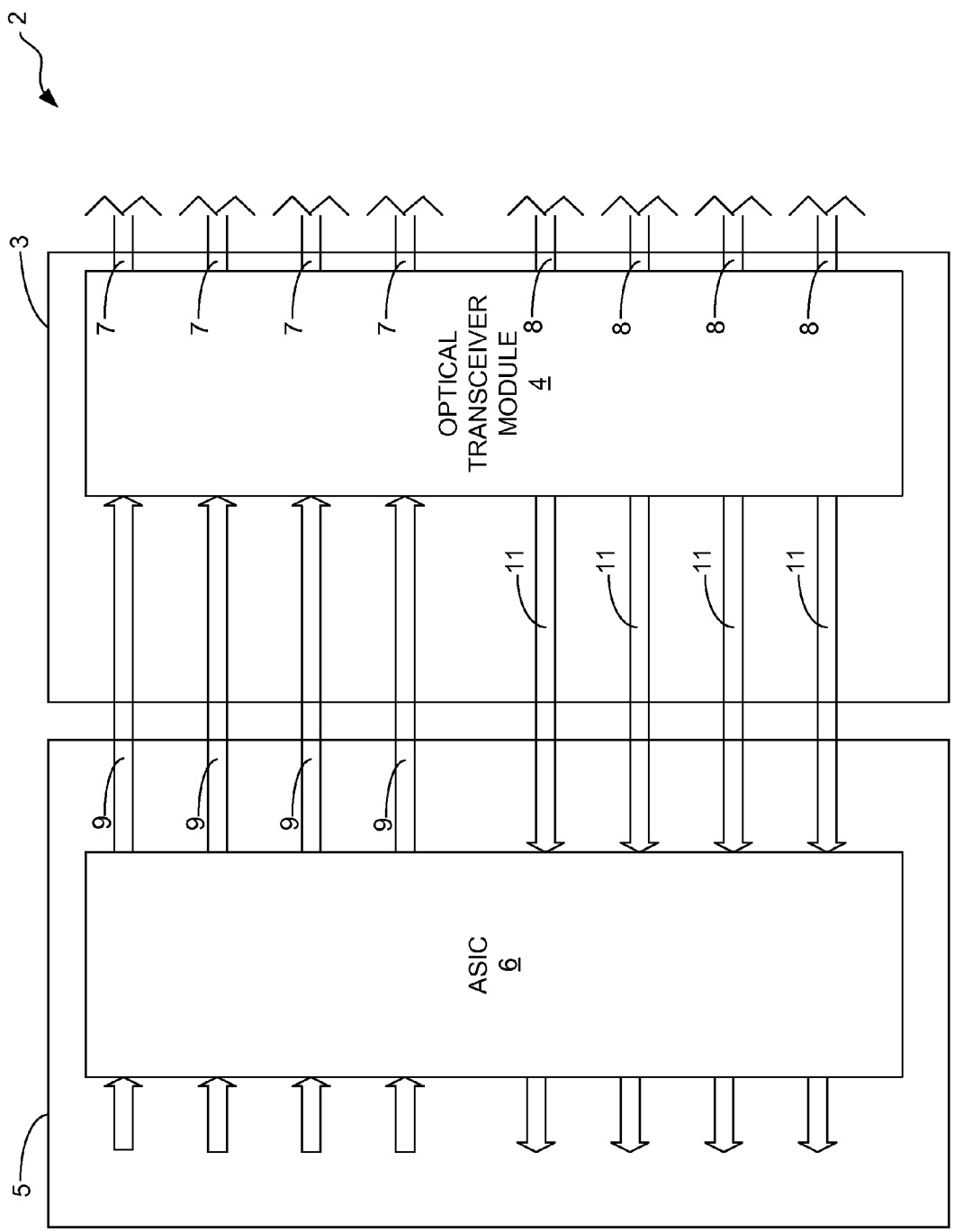
FIG. 1 illustrates a block diagram of a known optical communications system of a known switching system.

In accordance with the embodiments of the invention, a gearbox IC that is compatible with current ASIC designs currently used in optical fiber links is incorporated into an optical communications system to achieve a high-speed optical fiber link that at least doubles the data rate of the aforementioned known optical fiber link. The gearbox IC enables the data rate of the optical fiber link to be dramatically increased without requiring a redesign of the ASIC that is currently used in the optical fiber link. The gearbox IC is configured to interface with multiple ASICs of the current ASIC design and to interface with a high-speed optical transceiver module.

In the transmit direction, the gearbox IC receives N lanes of electrical data signals from the ASICs, with each electrical data signal having a data rate of X Gbps, and outputs N/2 lanes of electrical data signals, with each electrical data signal having a data rate of 2X Gbps, where N is a positive integer that is equal to or greater than 2 and X is a positive number that is equal to or greater than 25. The high-speed optical transceiver module receives the N/2 electrical data signals output from the gearbox IC, produces N/2 respective optical data signals and outputs the optical data signals onto N/2 optical fibers, with each optical data signal having a data rate of 2X.

In the receive direction, the high-speed optical transceiver module receives N/2 optical data signals over N/2 optical fibers and converts them into N/2 respective electrical data signals. The N/2 electrical data signals are then received over N/2 lanes at respective inputs of the gearbox IC, which converts the N/2 electrical data signals into N electrical data signals, each having a data rate of X Gbps. The gearbox IC then outputs the N electrical data signals onto N lanes for delivery to respective inputs of the ASICs. The ASICs then process the electrical data signals in the normal manner.

Thus, incorporation of the gearbox IC into the optical communications system allows ASICs of an existing design to be used with a high-speed optical transceiver module to achieve a data rate for the optical fiber link that is at least double the previous data rate of the link. These and other features and advantages of the invention will now be described with reference to the illustrative, or exemplary, embodiments shown in FIGS. 2-9, in which like reference numerals represent like elements or features.

Figure 2:
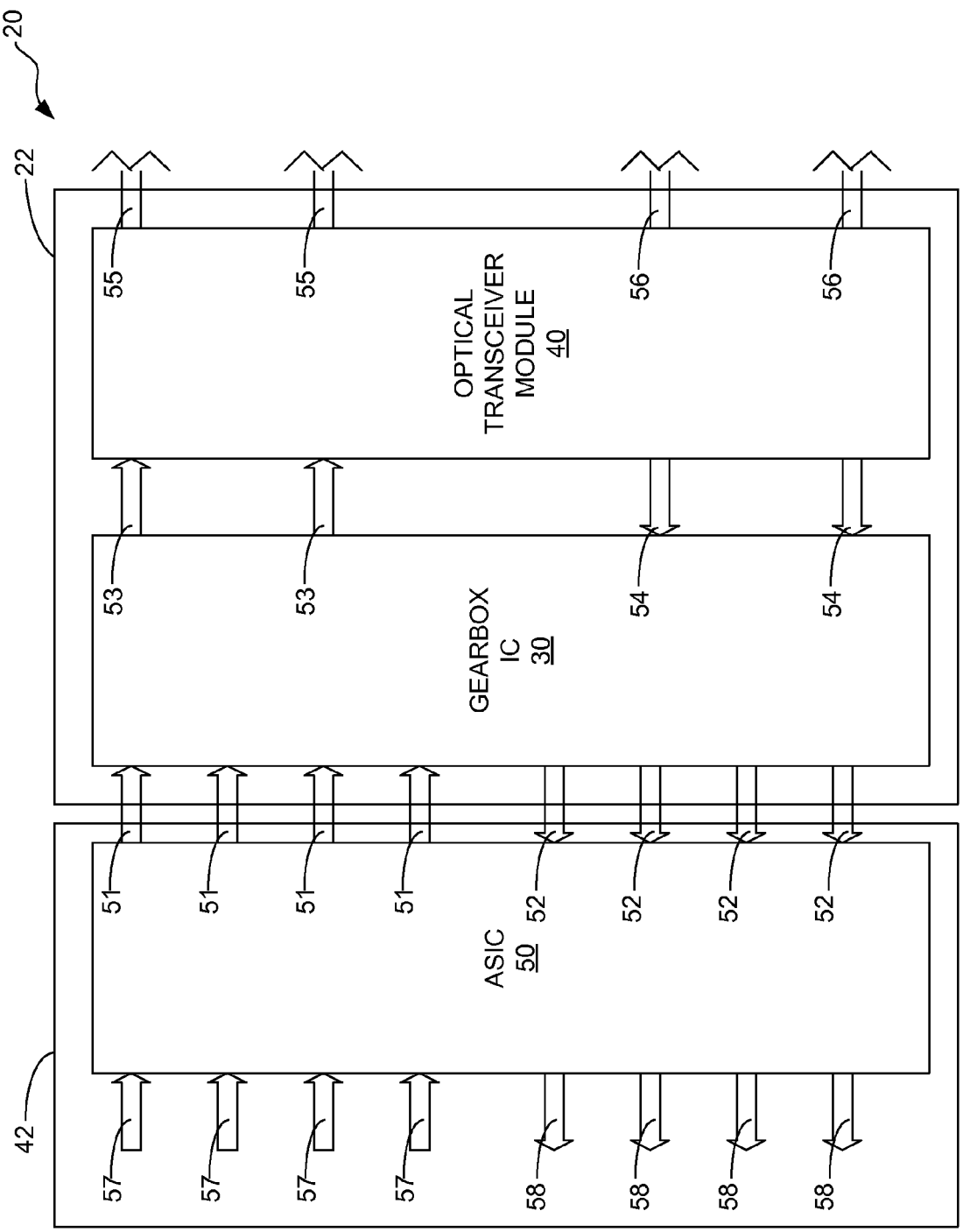
FIG. 2 illustrates a block diagram of an optical communications system located on one end of the high-speed optical fiber link in accordance with one illustrative, or exemplary, embodiment of the invention.

FIG. 2 illustrates a block diagram of an optical communications system 20 located on one end of the high-speed optical fiber link in accordance with one illustrative, or exemplary, embodiment of the invention. The optical communications system 20 comprises a first circuit board 22, a gearbox IC 30 mounted on the first circuit board 22, a high-speed optical transceiver module 40 mounted on the first circuit board 22, a backplane circuit board 42, and ASIC 50 mounted on the backplane circuit board 42. It should also be noted that although two separate circuit boards 22 and 42 are shown in FIG. 2, the gearbox IC 30, the high-speed optical transceiver module 40 and the ASIC 50 could be mounted on a single circuit board, such as circuit board 22.

In accordance with the illustrative embodiment shown in FIGS. 2, N=4 and X=25 Gbps. Therefore, there are four output lanes 51 interconnecting the ASIC 50 and the gearbox IC 30 and four input lanes 52 interconnecting the ASIC 50 and the gearbox IC 30. There are two output lanes 53 interconnecting the gearbox IC 30 and the optical transceiver module 40 and two input lanes 54 interconnecting the optical transceiver module 40 and the gearbox IC 30. There are two output optical fibers 55 and two input optical fibers 56 optically and mechanically coupled to the optical transceiver module 40. In the transmit direction, four 25 Gbps electrical data signals are output on the output lanes 51 from the ASIC 50 to the gearbox IC 30. The gearbox IC converts the four 25 Gbps electrical data signals into two 50 Gbps electrical data signals and outputs the two 50 Gbps electrical data signals onto output lanes 53 to the optical transceiver module 40.

The optical transceiver module 40 converts each 50 Gbps electrical data signal into a 50 Gbps optical data signal and outputs the optical data signals onto output optical fibers 55. In the receive direction, the optical transceiver module 40 receives two 50 Gbps optical data signals output from the ends of the four input optical fibers 56 and converts them into two 50 Gbps electrical data signals. The two 50 Gbps optical data signals are then delivered over the two input lanes 54 to the gearbox IC 30, which converts the two 50 Gbps electrical data signals into four 25 Gbps electrical data signals. The four 25 Gbps electrical data signals are then delivered over the four input lanes 52 to the ASIC 50, which processes the 25 Gbps electrical data signals in the known manner in which the ASIC 6 shown in FIG. 1 processes 25 Gbps electrical data signals.

On the backplane side of the ASIC 50, there are typically four 25 Gbps input lanes 57 and four 25 Gbps output lanes 58 for communicating with other ASICs 50 and/or other gearbox ICs 30 of other optical communications systems that are identical to optical communications system 20 and located either within the same switching system or in other switching systems. Furthermore, another instance of the gearbox IC 30 may be added to the backplane side to double the data rate of the electrical data signals that are communicated between ASICs 50 of the backplane, as will now be described with reference to FIG. 3.

Figure 3:
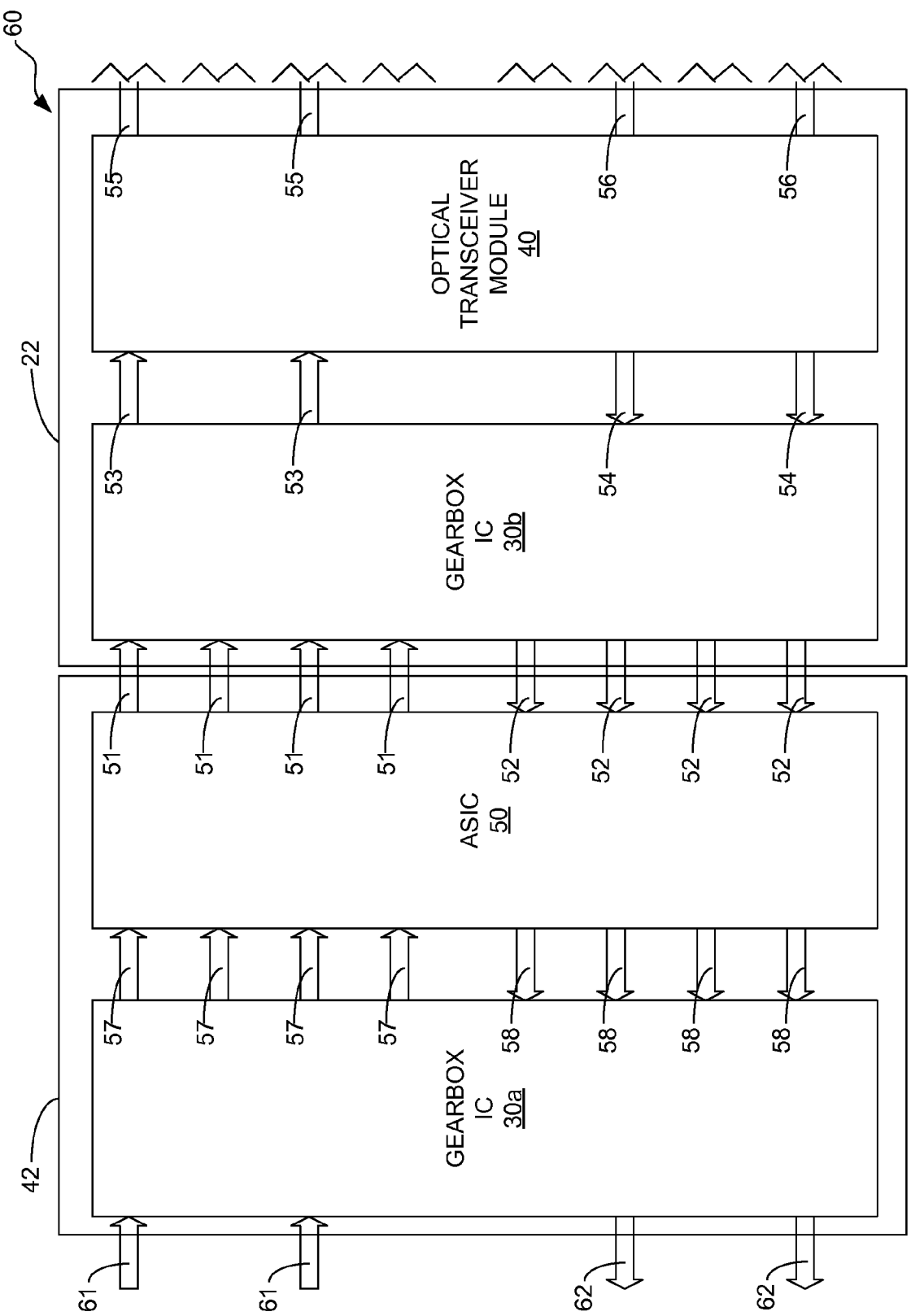
FIG. 3 illustrates a block diagram of an optical communications system that is identical to the optical communications system shown in FIG. 2 except that the optical communications system includes a second gearbox IC that is interconnected with the ASIC on the backplane side of the system.

FIG. 3 illustrates a block diagram of an optical communications system 60 that is identical to the optical communications system 20 shown in FIG. 2 except that the optical communications system 60 includes a second gearbox IC 30b that is interconnected with the ASIC 50 on the backplane side of the system 60. The second gearbox IC 30b receives two 50 Gbps electrical data signals over two input lanes 61 and outputs two 50 Gbps electrical data signals over two output lanes 62. The two 50 Gbps electrical data signals that are received in the first gearbox IC 30a over input lanes 61 are output from an identical gearbox IC 30 of an identical optical communication system 60 located elsewhere in the same switching system. Similarly, the two 50 Gbps electrical data signals that are output from the first gearbox IC 30a over output lanes 62 are input to an identical gearbox IC 30 of an identical optical communication system 60 located elsewhere in the same switching system. In this way, the gearbox ICs 30 allow ASICs 50 of the same switching system or of different, but similarly configured, switching systems to communicate with one another at the higher data rate of 50 Gbps instead of 25 Gbps.

Figure 4:
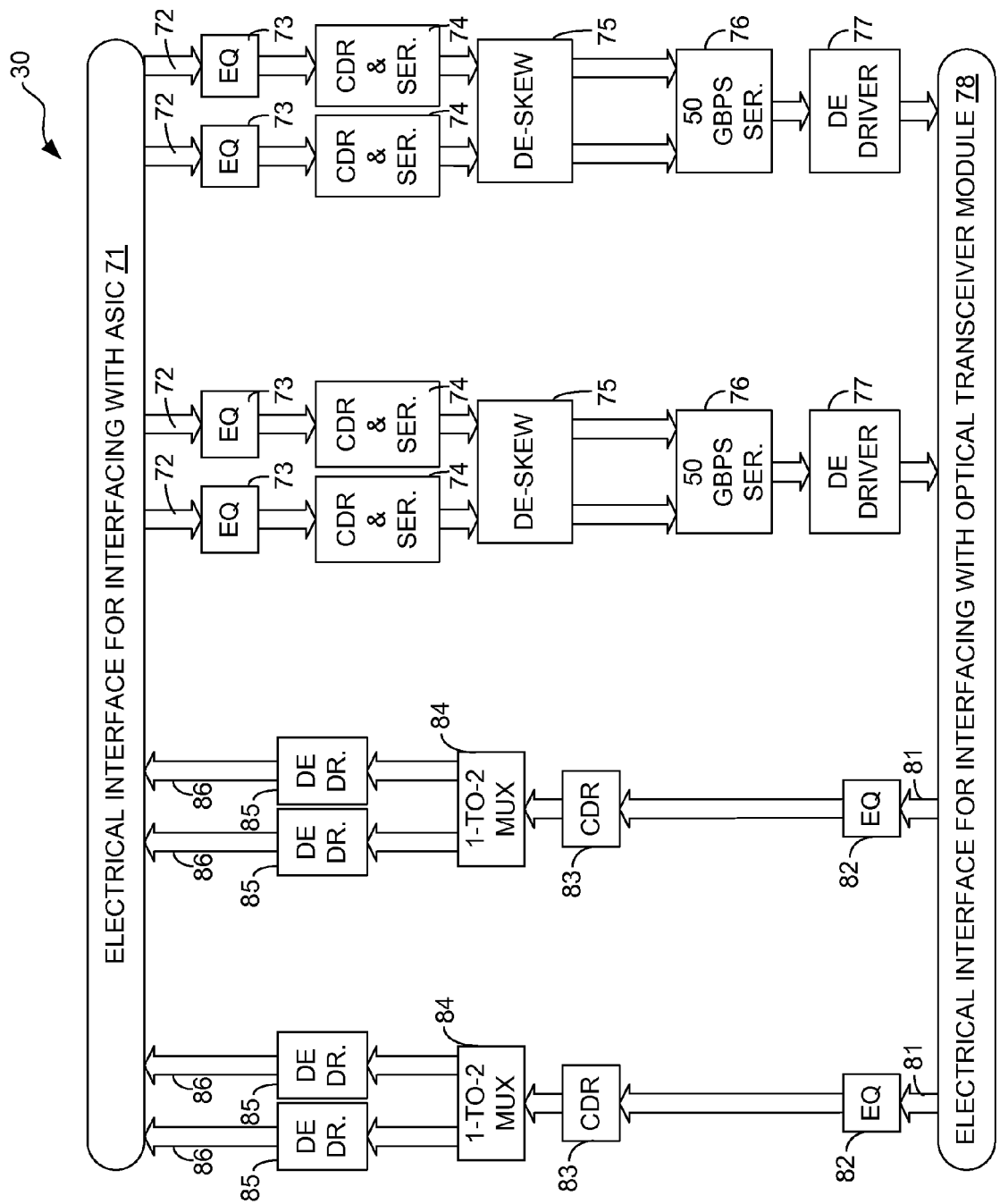
FIG. 4 illustrates a block diagram of the gearbox IC shown in FIG. 2 in accordance with an illustrative embodiment.

FIG. 4 illustrates a block diagram of the gearbox IC 30 shown in FIG. 2 in accordance with an illustrative embodiment. In the illustrative embodiments described above with reference to FIGS. 2 and 3, the gearbox IC 30 has been described in terms of simply performing rate conversion, but to accomplish the rate conversion, the gearbox IC 30 performs additional operations, such as, for example, clock and data recovery (CDR), bit alignment, serialization, and demultiplexing. The components of the gearbox IC 30 and the operations that they perform will now be described with reference to FIG. 4.

An electrical interface 71 interfaces the gearbox IC 30 with the ASIC 50. The electrical interface 71 may be, for example, an XLAUI interface, which is a well-known interface for interfacing ICs. For the incoming 25 Gbps electrical data signals received over lanes 51 from the ASIC 50, two pairs of lanes 72 that are internal to the gearbox IC 30 provide the electrical data signals to respective equalizers 73. The equalizers 73 restore the respective electrical data signals to their original waveforms and output each pair of the restored electrical data signals to respective CDR and deserializer components 74. The CDR and deserializer components 74 perform clock and data recovery and deserialization on each of the electrical data signals of the respective pairs and output the resulting pairs of electrical data signals to respective de-skew components 75. The de-skew components 75 perform static and dynamic phase alignment on the respective pairs of electrical data signals and provide the pairs of phase-aligned electrical data signals to respective 50 Gbps serializer components 76.

The 50 Gbps serializer components 76 perform serialization on the two phase-aligned electrical data signals of the respective pairs to produce respective 50 Gbps electrical data signals. The two 50 Gbps electrical data signals are then delivered to respective de-emphasis (DE) drivers 77, which de-emphasize and amplify the respective 50 Gbps electrical data signals and deliver the respective 50 Gbps electrical data signals to electrical interface 78. The electrical interface 78 is a physical layer/media access layer device (PMD) configured to interface the gearbox IC 30 with the optical transceiver module 40 (FIG. 2). The resulting 50 Gbps electrical data signals are then delivered to the optical transceiver module 40, which converts them into 50 Gbps optical data signals and couples the optical data signals onto respective optical fibers 55 (FIG. 2). Illustrative embodiments of the optical transceiver module 40 will be described below detail with reference to FIGS. 7 and 8.

In the receive direction, the electrical interface 78 receives two 50 Gbps electrical data signals from the optical transceiver module 40 (FIG. 2) and delivers them via respective internal lanes 81 to respective equalizers 82. The equalizers 82 perform equalization on the respective 50 Gbps electrical data signals and deliver the equalized electrical data signals to respective CDR components 83. The CDR components 83 perform clock and data recovery algorithms on the respective electrical data signals and deliver pairs of the respective 50 Gbps electrical data signals to respective 1-to-2 multiplexers (MUXes) 84. Each of the MUXes 84 converts a respective 50 Gbps electrical data signal into a pair of 25 Gbps electrical data signals, which are then delivered to respective DE drivers 85. The DE drivers 85 de-emphasize and amplify the respective 25 Gbps electrical data signals and output the respective 25 Gbps electrical data signals onto internal lanes 86 for delivery to the electrical interface 71. The electrical interface 71 then outputs the four 25 Gbps electrical data signals over lanes 52 (FIG. 2) to the ASIC 50 (FIG. 4).

It should be noted that many modifications may be made to the gearbox IC 30 shown in FIG. 2 while still allowing the gearbox IC 30 to perform the tasks described above of converting pairs of 25 Gbps electrical data signals into 50 Gbps electrical data signals, and vice versa. For example, the equalizers 73 and 82 and the de-emphasis drivers 77 and 85 are optional in many cases depending on the trace lengths that carry the corresponding electrical data signals and the strength or integrity of the corresponding electrical data signals. It should also be noted that other variations may be made to the gearbox IC 30, such as replacing certain components that perform certain functions with other components that perform similar or equivalent functions. Persons of skill in the art will understand the manner in which such modifications can be made to the gearbox IC 30 while still allowing it to perform the functions described above with reference to FIGS. 2-4.

Figure 5:
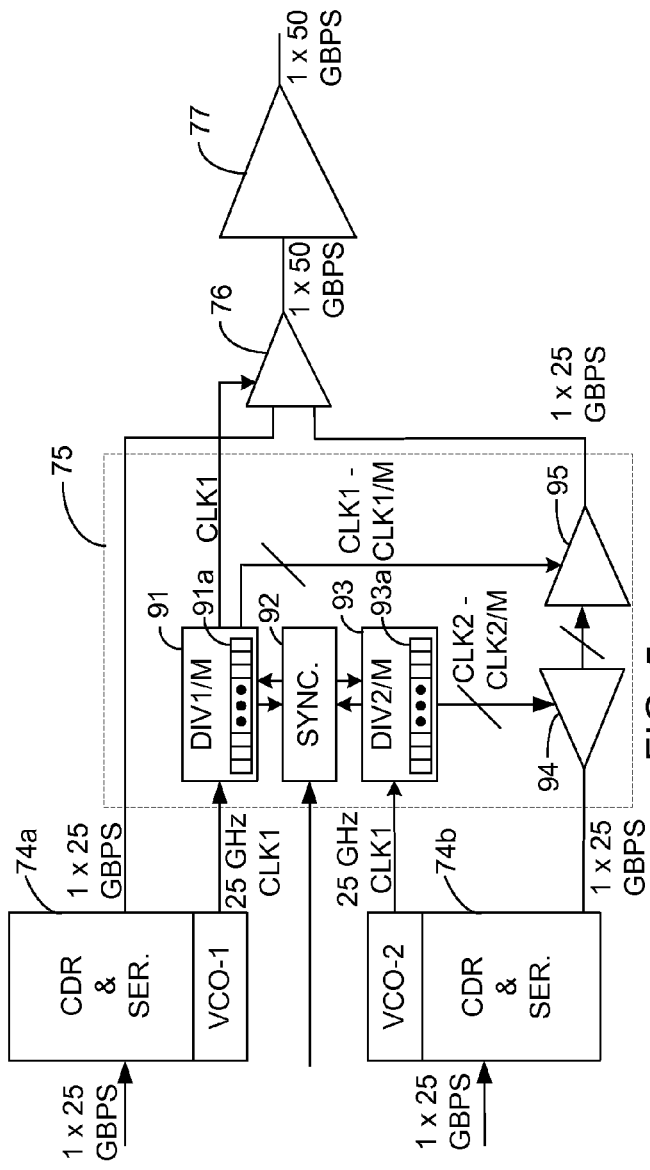
FIG. 5 illustrates a block diagram of a portion of the gearbox IC shown in FIG. 4.
Figure 6:
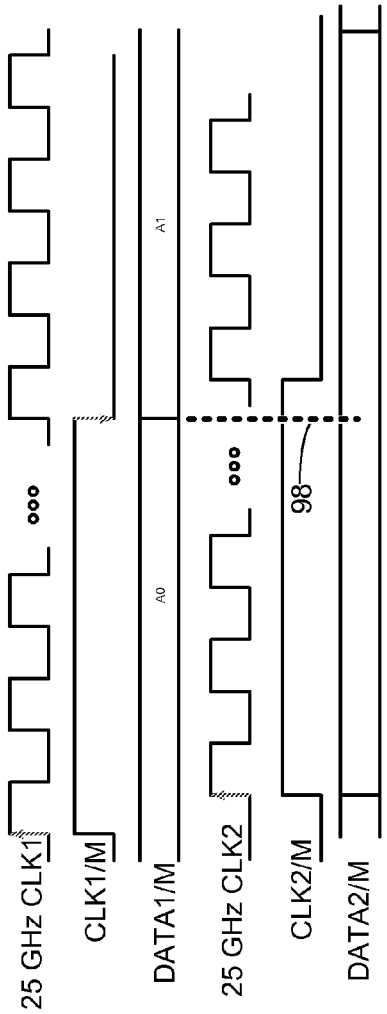
FIG. 6 illustrates a timing diagram that demonstrates the timing of the portion of the gearbox IC shown in FIG. 5.

FIG. 5 illustrates a block diagram of a portion of the gearbox IC shown in FIG. 4 corresponding to a pair of the CDR and deserializer components 74, a respective de-skew component 75, a respective 50 Gbps serializer 76, and a respective DE driver 77. FIG. 6 illustrates a timing diagram that demonstrates the timing of the portion of the gearbox IC shown in FIG. 5. As indicated above with reference to FIG. 4, the CDR and serializer components 74 perform clock and data recovery and serialization on each of the electrical data signals of the respective pairs and output the resulting pairs of electrical data signals to respective de-skew components 75. The respective de-skew component 75 performs phase alignment on the respective pair of 25 Gbps electrical data signals and provides the phase-aligned pair of electrical data signals to the respective 50 Gbps serializer component 76. The 50 Gbps serializer component 76 performs serialization on the two phase-aligned 20 Gbps electrical data signals of the respective pairs to produce a single 50 Gbps electrical data signal. The respective DE driver 77 de-emphasizes and amplifies the 50 Gbps electrical data signal and delivers it to the electrical interface 78 (not shown in FIG. 5). A more detailed description of these components and the processes they perform will now be provided with reference to FIGS. 5 and 6.

When the two 25 Gbps electrical data signals are received in the respective CDR & serializer components 74a and 74b, it is unlikely that their phases will be aligned. The timing diagram shows a first waveform labeled 25 GHz CLK1 corresponding to the clock signal that is recovered from the 25 Gbps data stream received in the CDR & Serializer component 74a. The timing diagram shows a second waveform labeled 25 GHz CLK2 corresponding to the clock signal that is recovered from the 25 Gbps data stream received in the CDR & Serializer component 74b. VCO-1 of CDR & serializer component 74a locks onto the rising edge of the 25 Gbps electrical data signal and generates a 25 Gigahertz (GHz) clock signal, labeled 25 GHz CLK1, that is aligned with the rising edge of the 25 Gbps electrical data signal. Likewise, VCO-2 of CDR & serializer component 74b generates a 25 GHz clock signal, labeled 25 GHZ CLK2, that is aligned with the rising edge of the 25 Gbps electrical data signal received at the input of component 74b. Because the 25 Gbps electrical data signals received at the inputs of components 74a and 74b likely will not be in perfect phase alignment, the timing diagram of FIG. 6 shows these clock signals as not being phase-aligned for demonstrative purposes.

The purpose of the De-skew component 75 is to phase-align the two 25 Gbps electrical data signals received in the two CDR & serializer components 74a and 74b. The elements shown in the dashed box 75 in FIG. 5 represent the elements of the De-skew component 75 shown in FIG. 4. Components 74a, 74b and 75 together comprise phase-alignment circuitry. These components operate in conjunction with one another to perform the phase-alignment task, as will now be described with reference to FIGS. 5 and 6. A first divider 91, labeled DIV1-M, receives the 25 GHz clock signal, CLK1, from VCO-1 and divides it by 2 thru M, where M is an integer that is greater than or equal to 2 and that corresponds to the number of bits that make up a word in the 25 Gbps electrical data signal stream. The value of M will typically be 16 or 32, but could be any value. By dividing clock signal CLK1 by 2 thru M, the first divider 91 generates clock signals CLK1/2, CLK1/3, CLK1/4 . . . CLK1/M. Thus, for example, clock signal CLK1/2 has a frequency that is one-half the frequency of CLK1 and clock signal CLK1/M has a frequency that is 1/Mth the frequency of clock signal CLK1.

A second divider 93, labeled DIV2-M, receives the 25 GHz clock signal, CLK2, from VCO-2 and divides it by 2 thru M to generate clock signals CLK2/2, CLK2/3, CLK2/4 . . . CLK2/M. Thus, for example, clock signal CLK2/2 has a frequency that is one-half the frequency of CLK2 and clock signal CLK2/M has a frequency that is 1/Mth the frequency of clock signal CLK2. Only clock signals CLK1, CLK2, CLK1/M and CLK2/M are shown in the timing diagram of FIG. 6. It can be seen in the timing diagram that the rising edge of clock signal CLK1/M is aligned with the rising edge of clock signal CLK1 at the beginning of each clock cycle of clock signal CLK1/M Likewise, the rising edge of clock signal CLK2/M is aligned with the rising edge of clock signal CLK2 at the beginning of each clock cycle of clock signal CLK2/M. The rising edges of clock signals CLK1/2-CLK1/M−1 are aligned with the rising edge of clock signal CLK1 at the beginning of each clock cycle of clock signals CLK1/2CLK1/M−1, respectively. The rising edges of clock signals CLK2/2-CLK2/M−1 are aligned with the rising edge of clock signal CLK2 at the beginning of each clock cycle of clock signals CLK2/2-CLK2/M−1, respectively.

The first and second dividers 91 and 93 have counters 91a and 93a, respectively, that count from zero to M−1. The counter 91a is incremented on the rising edge of clock CLK1 and the counter 93a is incremented on the rising edge of clock CLK2, although the counters could instead be configured to increment on the falling edges of the respective clock signals. Once the counter 91a has reached the value of M−1, the divider 91 transitions the clock signal CLK1/M from a logic one value to a logic zero value on the next rising edge of clock signal CLK1. Likewise, once the counter 93a has reached the value of M−1, the counter 93a transitions the clock signal CLK2/M from a logic one value to a logic zero value on the next rising edge of clock signal CLK2.

Element 92 is a synchronization monitor that monitors the phase misalignment of the clocks CLK1/M and CLK2/M and that simultaneously resets the counters 91a and 93a to zero. In this way, the clock signals CLK1/2-CLK1/M and CLK2/2-CLK2/M, respectively, are placed in alignment with one another and kept in alignment with one another. Once the clock signals CLK1/M and CLK2/M have transitioned from a logic one value to a logic zero value, those clock signals remain in the logic zero state during the time period that the counters 91a and 93a are incremented again from zero to M−1. After the counters 91a and 93a have reached the value of M−1, the dividers 91 and 93 transition the clock signals CLK1/M and CLK2/M from a logic zero value to a logic one value on the next rising edge of clock signals CLK1 and CLK2, respectively. The synchronization monitor 92 then simultaneously resets the counters 91a and 93a to zero, which ensures that the falling edges of the clock signals CLK1/M and CLK2/M are kept in alignment. Clock signals CLK1/2 thru CLK1/M−1 and CLK2/2 thru CLK2/M−1 are triggered based on the values of the counters 91a and 93a, which ensures that they remain properly aligned.

Element 94 is a 1-to-M demultiplexer (DeMUX) and element 95 is an M-to-1 multiplex (MUX). The DeMUX 94 receives the 25 Gbps electrical data signal that is received at the input of CDR & serializer 74b. The DeMUX 94 also receives the clock signals CLK2, CLK2/2, CLK2/3, etc., thru CLK2/M. On the rising and falling edges of clock signals CLK2 thru CLK2/M, the DeMUX 94 outputs one of the M bits of the 25 Gbps electrical data signal such that by the end of a clock cycle of CLK2/M, M bits are ready to be delivered in parallel to the MUX 95. On the next rising edge of clock signal CLK2, the M bits are delivered in parallel to the MUX 95. The waveform corresponding to the output from the DeMUX 94 is labeled DATA2/M in FIG. 6.

The MUX 95 receives clock signals CLK1, CLK1/2, CLK1/3, etc., thru CLK1/M and outputs one of the M bits from the MUX 95 on the rising and falling edge of a respective one of these clock signals such that by the end of a clock cycle CLK1/M, the M bits are ready to be output serially from the MUX 95. On each falling edge of clock signal CLK1, the MUX 95 outputs one of the M bits such that a serial bit stream at a data rate of 25 Gbps is output from the MUX 95. The 25 Gbps serial bit stream output from the MUX 95, which is labeled DATA1/M in FIG. 6, is now phase-aligned with the 25 Gbps electrical data signal passed through the CDR and serializer component 74a to the 50 Gbps serializer 76.

The 50 Gbps serializer 76 comprises first rate conversion circuitry for converting the data rate in the transmit direction from 25 Gbps to 50 Gbps. The serializer 76 selects the bit received at one of its inputs on the rising edge of the 25 GHz clock signal CLK1 to be output therefrom and selects the bit received at the other of its inputs on the next falling edge of clock signal CLK1 to be output therefrom. In this way, the serializer 76 converts the two 25 Gbps bit streams received at its inputs into one 50 Gbps bit stream at its output. The DE driver 77 then performs demphasis and amplification of the 50 Gbps electrical data signal, which is then provided to the optical transceiver module 40, as described above with reference to FIGS. 2-4.

The configuration shown in FIG. 5 can tolerate a skew, or phase mismatch, of M/2−1 between the two 25 Gbps electrical data signals received by the CDR & serializer components 74a and 74b. In other words, there can be a maximum allowable phase misalignment between the two 25 Gbps electrical data signals of M/2−1 cycles of the clock signal CLK1. Provided that the amount of phase misalignment is not greater than the maximum allowable phase misalignment, the 50 Gbps electrical data signal output from the 50 Gbps serializer 76 and from the DE driver 77 will have the proper bit values. This is accomplished, in part, by ensuring that the falling edge of clock signal CLK1/M occurs somewhere in the middle of the data signal DATA2/M, as shown in FIG. 6 by the vertical dashed line 98.

As indicated above, the synchronization monitor 92 monitors and compares the values of the counters 91a and 93a. When it makes this comparison, if the count values differ by more than M/2−1, this is an indication that the current amount of phase misalignment is greater than the maximum allowable phase misalignment. If this occurs, the synchronization monitor 92 sends an interrupt to a user interface (not shown) and resets the counters 91a and 93a to zero. The interrupt informs the user that an error has occurred that may require link diagnostic tests to be performed or some other action to be taken.

With reference again to FIG. 4, the logic within the gearbox IC 30 that converts each 50 Gbps electrical data signal output from the optical transceiver module 40 into a pair of 25 Gbps electrical data signals is less complicated than the logic described above with reference to FIG. 5 due to the fact that a de-skew process does not need to be performed on the data moving in this direction. The logic within the gearbox IC 30 that is used for performing the 50-to-25 Gbps rate conversion process is represented by the pairs of CDRs 83 and the 1-to-2 MUXes 84 shown in FIG. 4. Like the CDRs & serializers 74a and 74b shown in FIG. 5, each CDR 83 includes a VCO (not shown) that locks onto the rising edge of the respective 50 Gbps electrical data signal and outputs a 50 GHz clock signal. This 50 GHz clock signal is output to the respective 1-to-2 MUX 84. As the 50 Gbps serial bit stream is received at the input terminal of the respective 1-to-2 MUX 84, it is sampled on both the rising and falling edges of the 50 GHz clock signal such that each successive bit in the bit stream is provided to a different one of the output terminals of the 1-to-2 MUX 84 at a data rate of 25 Gbps.

Figure 7:
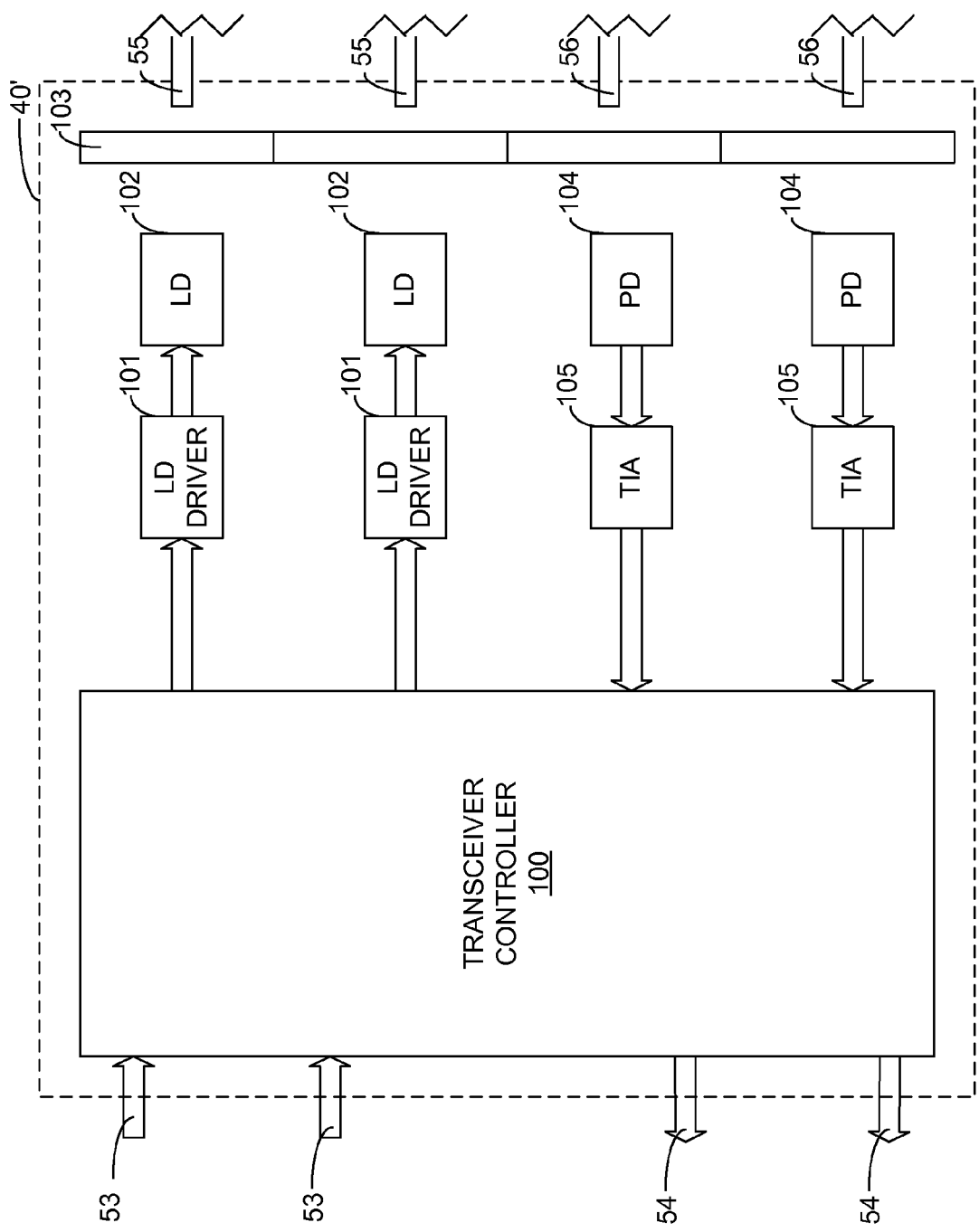
FIG. 7 illustrates a block diagram of the high-speed optical transceiver module shown in FIGS. 2 and 3 in accordance with an illustrative embodiment.

FIG. 7 illustrates a block diagram of the high-speed optical transceiver module 40 shown in FIGS. 2 and 3 in accordance with an illustrative embodiment. The optical transceiver module 40 in accordance with this illustrative embodiment will be referred to herein as optical transceiver module 40'. Two 50 Gbps electrical data signals output from the gearbox IC 30 (FIGS. 2-4) are delivered via lanes 53 to a transceiver controller 100 of the optical transceiver module 40'. The transceiver controller 100 typically includes a programmable control device (not shown) such as a microcontroller or microprocessor, for example, as well as other electrical circuitry (not shown) for processing the electrical data signals received in the controller 100 via lanes 53 and for processing electrical data signals to be output from the controller onto lanes 54. In the transmit direction, the two 50 Gbps electrical data signals received in the controller 100 on lanes 53 are processed and then delivered to the laser diode (LD) drivers 101. The LD drivers 101 modulate the respective LDs 102 in accordance with the respective 50 Gbps electrical data signals to produce respective 50 Gbps optical data signals. The two 50 Gbps optical data signals produced by the two LDs 102 are then coupled by an optics system 103 into the ends of two respective optical fibers 55 for transmission over the optical fiber link.

In the receive direction, two 50 Gbps optical data signals are output from the ends of two respective optical fibers 56 and are coupled by the optics system 103 onto two respective photodiodes 104, which convert the optical data signals into respective electrical current signals. The photodiodes 104 may be, for example, p-intrinsic-n (PIN) diodes. The respective electrical current signals are then output to respective trans-impedance amplifiers (TIAs) 105, which convert the electrical current signals into respective 50 Gbps electrical voltage signals. The two 50 Gbps electrical voltage signals are then processed by electrical circuitry (not shown) of the transceiver controller 100, such as CDR circuitry, to recover the data contained in the electrical voltage signals to produce two 50 Gbps electrical data signals. The two 50 Gbps electrical data signals are then output on lanes 54 for delivery to the gearbox IC 30.

The LDs 102 are not limited to being any particular types of LDs. In accordance with the illustrative embodiment, the LDs 102 are vertical cavity surface emitting laser diodes (VCSELs). The VCSELs that are used for this purpose operate at data rates of at least around 35 GHz (0.7× data rate of 50 Gbps) and still allow the data rate of the optical data signals that are transmitted over the fibers 55 to be 50 Gbps. This is made possible in large part through the pre-conditioning and post-conditioning of the electrical data signals in the gearbox IC 30 and/or in the electrical circuitry of the transceiver controller 100. Of course, VCSELs that operate at even higher data rates, e.g., 50 Gbps, are also suitable for this purpose.

The optics system 103 may be any type of suitable optics system such as, for example, a refractive or diffractive optics system comprising one or more refractive or diffractive optical elements, respectively. As will be understood by those of skill in the art, a variety of optical elements exist or can readily be designed and manufactured for this purpose. In the illustrative embodiment shown in FIG. 7, separate optical fibers 55 and 56 are used for each LD 102 and photodiode 104, respectively. As will now be described with reference to FIG. 8, a single optical fiber may be used with each pair of LDs 102 and photodiodes 104 to provide a bidirectional optical fiber link.

Figure 8:
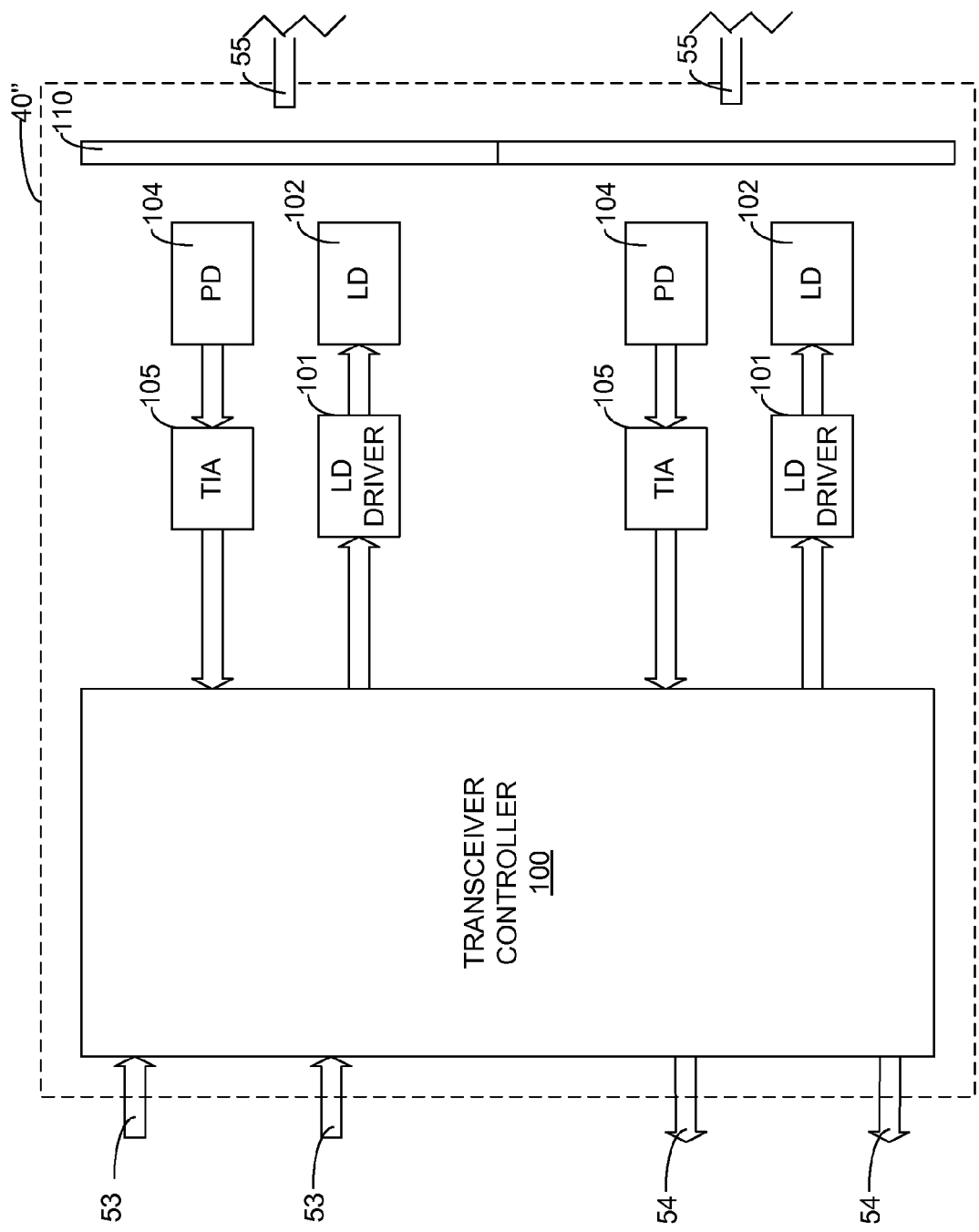
FIG. 8 illustrates a block diagram of the high-speed optical transceiver module shown in FIGS. 2 and 3 in accordance with another illustrative embodiment.

FIG. 8 illustrates a block diagram of the high-speed optical transceiver module 40 shown in FIGS. 2 and 3 in accordance with another illustrative embodiment. The optical transceiver module 40 in accordance with this illustrative embodiment will be referred to herein as optical transceiver module 40". The optical transceiver module 40" is identical to the optical transceiver module 40' shown in FIG. 7 except that the optical transceiver module 40" has an optics system 110 that is different from the optics system 103 shown in FIG. 7, as will be described below in detail. Also, for reasons that will be described below in connection with the optics system 110, the optical transceiver module 40" is connected to only two (i.e., N/2) optical fibers 55 instead of the four (i.e., N) optical fibers 55 and 56 shown in FIG. 7. Each of the optical fibers 55 acts as both a transmit optical fiber for transmitting optical data signals over the optical fiber link and as a receive optical fiber for receiving optical data signals over the optical fiber link. Therefore, these optical fibers 55 will be referred to herein as transmit/receive optical fibers.

In the transmit direction, two 50 Gbps electrical data signals output from the gearbox IC 30 (FIGS. 2-4) are delivered via lanes 53 to the transceiver controller 100 of the optical transceiver module 40". As stated above, the transceiver controller 100 typically includes a programmable control device (not shown) such as a microcontroller or microprocessor, for example, as well as other electrical circuitry (not shown) for pre-processing of the electrical data signals that are received in the controller 100 via lanes 53 and for post-processing of the electrical data signals that are to be output from the controller 100 onto lanes 54. The two 50 Gbps electrical data signals received in the controller 100 on lanes 53 are processed and then delivered to the LD drivers 101. The LD drivers 101 modulate the respective LDs 102 in accordance with the respective 50 Gbps electrical data signals received thereby to produce respective 50 Gbps optical data signals. The two 50 Gbps optical data signals produced by the two LDs 102 are then coupled by the optics system 110 into the ends of two respective transmit/receive optical fibers 55 for transmission over the optical fiber link.

In the receive direction, two 50 Gbps optical data signals are output from the ends of the two respective transmit/receive optical fibers 55 and are coupled onto the two respective photodiodes 104, which convert the optical data signals into respective electrical current signals. The respective electrical current signals are then output to the respective TIAs 105, which convert the electrical current signals into respective 50 Gbps electrical voltage signals. The two 50 Gbps electrical voltage signals are then processed by electrical circuitry (not shown) of the transceiver controller 100, such as a CDR circuitry, to recover the data contained in the electrical voltage signals to produce two 50 Gbps electrical data signals. The two 50 Gbps electrical data signals are then output on lanes 54 for delivery to the gearbox IC 30.

In accordance with the illustrative embodiment shown in FIG. 8, the optics system 110 performs optical muxing and demuxing operations to allow optical data signals to be simultaneously transmitted and received over optical fibers 55 such that full optical duplexing is achieved over the optical fiber link. In other words, optical data signals are simultaneously transmitted and received on each of the optical fibers 55 at a data rate of at least 50 Gbps in each direction. Therefore, the optical fiber link is capable of simultaneously transmitting optical data signals at a data rate of 100 Gbps and receiving optical data signals at a data rate of 100 Gbps to provide an aggregate data rate for the optical fiber link of 200 Gbps using only two optical fibers 55. The manner in which such a full-duplex optical fiber link can be provided is disclosed in U.S. Pat. No. 8,326,157, issued on Apr. 4, 2012, entitled "A HIGH-SPEED OPTICAL TRANSCEIVER, A BI-DIRECTIONAL DUPLEX OPTICAL FIBER LINK, AND A METHOD FOR PROVIDING A BI-DIRECTIONAL DUPLEX OPTICAL FIBER LINK," which is incorporated by reference herein in its entirety. Therefore, in the interest of brevity, the optics system 110 and the optical MUXing and deMUXing operations performed thereby will not be described herein in further detail.

The above description of FIGS. 2-8 demonstrates illustrative embodiments of the invention that enable the data rate of an optical fiber link to be substantially increased (e.g., doubled) without having to redesign the ASICs that are used in the backplanes of the link. In the illustrative embodiments described above, a 50 Gbps optical transceiver module is used in conjunction with an ASIC that inputs and outputs 25 Gbps electrical data signals and with a gearbox IC that converts 25 Gbps electrical data signals into 50 Gbps electrical data signals, and vice versa, to upgrade an optical fiber link to have at least double its previous bandwidth. By avoiding the need to redesign the ASICs that are used in the backplane, a substantial cost savings is realized while still achieving the much higher bandwidth of the upgraded optical fiber link. It should be noted that while the embodiments of the invention have been described with respect to upgrading an optical fiber link, the invention applies equally to building a new optical fiber link that uses the optical communications systems 20 or 60 described above with reference to FIGS. 2 and 3, respectively.

It should be noted that the term "optical transceiver module," as that term is used herein, is intended to denote any type of optical communications module including an optical transmitter module that has optical transmitting capability, but not optical receiving capability, an optical receiver module that has optical receiving capability, but not optical transmitting capability, and an optical transceiver module that has both optical transmitting and optical receiving capability. It should also be noted that while the embodiments of FIGS. 7 and 8 show laser diodes and photodiodes for performing the electrical-to-optical conversion (EOC) and optical-to-electrical conversion (OEC), respectively, any suitable light sources and light detectors, respectively, may be used for this purpose. The terms EOC element and OEC element will be used herein to denote any such suitable light sources and light detectors, respectively.

Figure 9:
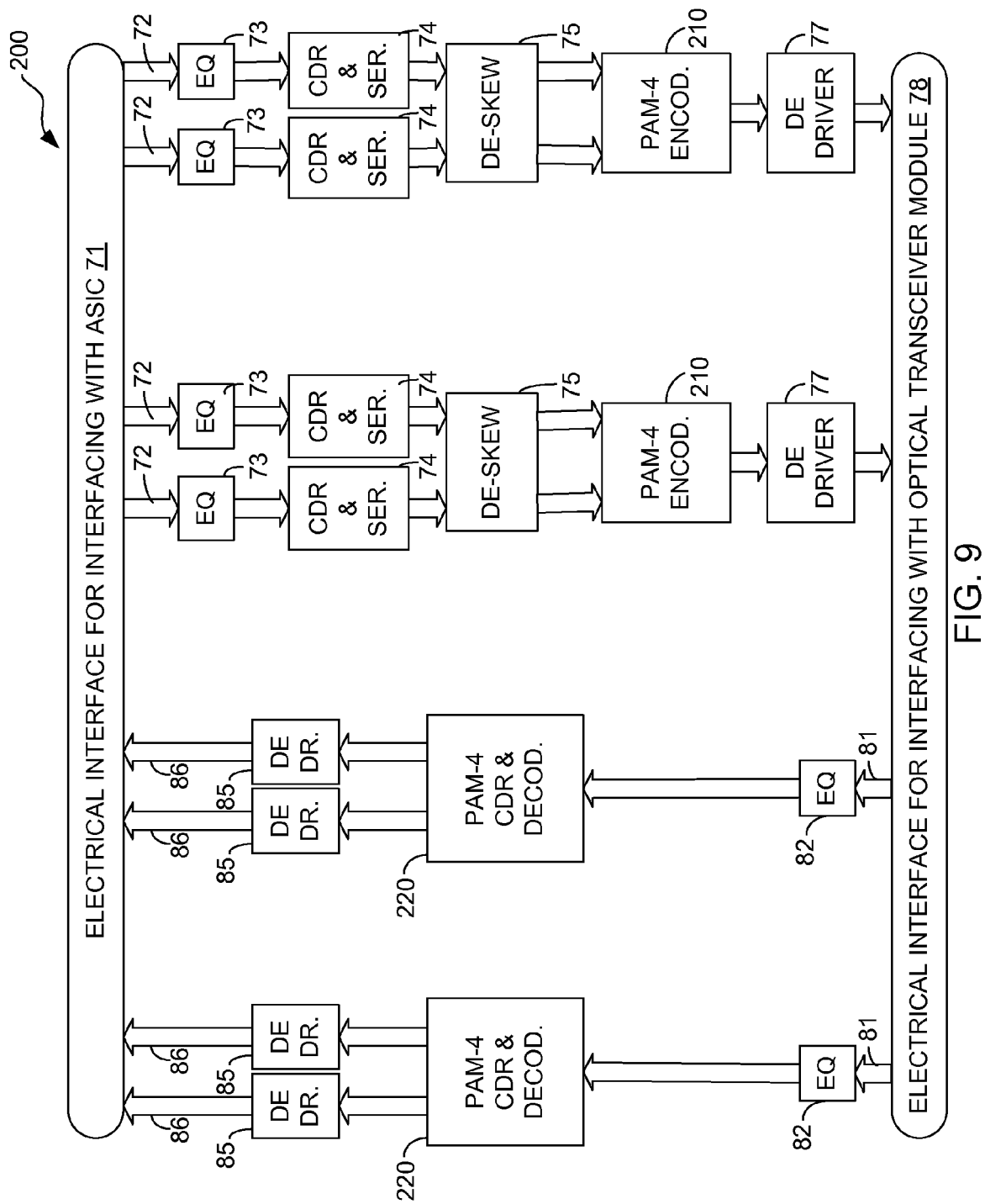
FIG. 9 illustrates a block diagram of the gearbox IC in accordance with another illustrative embodiment in which a pulse-amplitude modulation (PAM)-4 encoding scheme is used to encode pairs of the 25 Gbps electrical data signals.

FIG. 9 illustrates a block diagram of the gearbox IC 200 in accordance with another illustrative embodiment in which a pulse-amplitude modulation (PAM)-4 encoding scheme is used to encode pairs of the 25 Gbps electrical data signals input via the electrical interface 71 onto lanes 72. In the embodiment described above with reference to FIG. 4, the electrical data signals that are inputted into the gearbox IC 30 via the electrical interface 71 and the electrical data signals that are outputted from the gearbox IC 30 via electrical interface 78 are binary signals and the modulation scheme used in the optical transceiver modules 40, 40' and 40" is a binary modulation scheme in which a logical 1 or 0 bit of the electrical data signal is represented optically as a logical 1 or 0 level, respectively. This is not the case with the embodiment of FIG. 9. Using the PAM-4 encoding scheme in the gearbox IC 200 shown in FIG. 9 allows the optical transceiver modules 40, 40' and 40" to use a PAM-4 modulation scheme to achieve a 50 Gbps data rate on each channel while employing laser diodes and photodiodes that operate at speeds that are much lower than 50 GHz (e.g., 25 GHz). The PAM-4 encoding scheme is a known two-bit encoding scheme in which two bits are used to map the signal amplitude to one of four possible levels. In PAM-4, demodulation is performed by detecting the amplitude level of the carrier signal at every symbol period and mapping the amplitude level into a two-bit value. Because PAM-4 is a well-known encoding and modulation scheme, it will not be described herein in detail.

The gearbox IC 200 shown in FIG. 9 is similar in many respects to the gearbox IC 30 shown in FIG. 4 except that components 76 and 83 shown in FIG. 4 have been replaced with components 210 and 220, respectively. Component 210 is a PAM-4 encoder that receives the two 25 Gbps binary bit streams from the de-skew component 75 and combines one bit from each of the bit streams into a two-bit value that will be used to represent one of four amplitude levels. These amplitude levels are subsequently used by the laser diode driver 101 (FIGS. 7 and 8) to modulate the laser diode 102 to produce a PAM-4 encoded optical data signal. The circuitry that is shown in FIG. 5 and described above may be used in the PAM-4 encoding scheme depicted in FIG. 9 except that the 50 Gbps serializer 76 is replaced by the PAM-4 encoder 210. The output of the PAM-4 encoder 210 is a 25 Gbps PAM-4-encoded electrical data signal that carries twice the amount of information that was carried in each of the 25 Gbps electrical data signals that were inputted to the PAM-4 encoder 210. The DE driver 77 (optional) then performs demphasis and amplification on the 25 Gbps PAM-4-encoded electrical data signal. The 25 Gbps PAM-4-encoded electrical data signal is then provided to the optical transceiver modules 40' or 40", which perform the functions described above with reference to FIGS. 7 and 8.

By using the PAM-4 encoding scheme in the gearbox IC 200 to produce the electrical data signals that are ultimately used to drive the laser diodes 102, the laser diodes 102 can be much slower than 50 GHz (e.g., 25 GHz), and yet a data rate of 50 Gbps on each channel is still achieved due to the PAM-4 encoding. Likewise, the photodiodes 104 can be much slower than 50 GHz (e.g., 25 GHz) while still enabling a data rate of 50 Gbps to be achieved on each channel. In the receive direction, each equalizer 82 (optional) receives a 25 Gbps PAM-4-encoded electrical data signal from electrical interface 78 and performs equalization before delivering the equalized 25 Gbps PAM-4-encoded electrical data signal to a PAM-4 CDR and decoder circuit 220. The PAM-4 CDR and decoder circuit 220 performs CDR and PAM-4 decoding to convert the 25 Gbps PAM-4-encoded electrical data signal into two 25 Gbps binary-encoded electrical data signals, which are then provided to the DE driver circuits 85 (optional). The DE driver circuits 85 perform the same functions that were described above with reference to FIG. 4 before delivering the 25 Gbps binary electrical data signals over lanes 86 (FIG. 4) to the electrical interface 71.

It can be seen that implementing the PAM-4 encoding scheme in the gearbox IC 200 in the transmit and receive directions allows the optical transceiver module to use slower components (e.g., laser diodes and photodiodes operating at 25 GHz) to achieve a data rate of 50 Gbps on each of the transmit channels and on each of the receive channels, which corresponds to an aggregate data rate of 200 Gbps in the N=4 scenario depicted in the figures. Of course, other PAM encoding schemes may be used for this purpose. The PAM-4 encoding scheme is one example of a known PAM encoding scheme that is suitable for this purpose.

It should be noted that the invention has been described with reference to a few illustrative embodiments for the purpose of demonstrating the principles and concepts of the invention. The invention is not limited to the embodiments described herein, as will be understood by those of ordinary skill in the art in view of the description provided herein. Many modifications may be made to the embodiments described herein without deviating from the goals or objectives of the invention, and all such modifications are within the scope of the invention.

What is claimed is:

1. A gearbox integrated circuit (IC) comprising:
 a first electrical interface having N input terminals for inputting N electrical data signals having a data rate of X gigabits per second (Gbps) and N output terminals for outputting N electrical data signals having a data rate of X Gbps, wherein N is a positive integer that is equal to or greater than 2 and X is a positive number that is equal to or greater than 25;
 phase-alignment circuitry for phase-aligning pairs of the N inputted electrical data signals to produce N/2 pairs of phase-aligned electrical data signals;
 first rate conversion circuitry that receives the N/2 phase-aligned pairs of electrical data signals and converts each of the N/2 phase-aligned pairs into a serialized electrical data signal having a data rate of 2X Gbps;
 a second electrical interface having N/2 output terminals and N/2 input terminals, the serialized 2X Gbps electrical data signals being outputted from the gearbox IC via the N/2 output terminals of the second electrical interface; and second rate conversion circuitry that receives N/2 electrical data signals having a data rate of 2X Gbps that are inputted to the gearbox IC via the N/2 input terminals of the second electrical interface and converts the N/2 2X Gbps electrical data signals inputted via the second electrical interface into N electrical data signals having a data rate of X Gbps, and wherein the converted N X Gbps electrical data signals are outputted from the gearbox IC via the N output terminals of the first electrical interface.

2. The gearbox IC of claim 1, wherein the phase-alignment circuitry comprises:

N/2 pairs of clock and data recovery (CDR) circuits electrically coupled to the N input terminals of the first electrical interface, each pair of CDR circuits receiving a pair of the N electrical data signals inputted via the first electrical interface and processing the respective pair of electrical data signals to generate first and second clock signals, CLK1 and CLK2, respectively, wherein clock signal CLK1 is aligned with a rising or falling edge of a first one of the electrical data signals of the respective pair and wherein clock signal CLK2 is aligned with a rising or falling edge of a second one of the electrical data signals of the respective pair; and N/2 de-skew circuits, each de-skew circuit using the first and second clock signals CLK1 and CLK2 to phase-align a respective pair of the N electrical data signals to produce one of the N/2 phase-aligned pairs of electrical data signals.

3. The gearbox IC of claim 2, wherein the first rate conversion circuitry comprises:

N/2 serializer circuits, each serializer circuit receiving one of the N/2 phase-aligned pairs of electrical data signals and one of the clock signals CLK1 and CLK2 and converting the respective phase-aligned pair of electrical data signals into a respective one of the serialized 2X Gbps electrical data signals, each serialized 2X Gbps electrical data signal being output from an output terminal of the respective serializer circuit.

4. The gearbox IC of claim 3, further comprising:

N/2 de-emphasis drivers, each of the N/2 de-emphasis drivers receiving a respective one of the serialized 2X Gbps electrical data signals output from the output terminal of one of the N/2 serializer circuits, each de-emphasis circuit de-emphasizing and amplifying the respective serialized 2X Gbps electrical data signal before causing the respective serialized 2X Gbps electrical data signal to be output from the respective output terminal of the second electrical interface of the gearbox IC.

5. The gearbox IC of claim 4, further comprising:

N equalizers, each of the N equalizers equalizing one of the respective N electrical data signals input to the gearbox IC via one of the input terminals of the first electrical interface of the gearbox IC before the respective electrical data signal is received by the respective CDR circuit of the respective pair of CDR circuits.

6. The gearbox IC of claim 1, wherein the second rate conversion circuitry further comprises:

N/2 CDR circuits, each of the N/2 CDR circuits performing clock and data recovery on a respective one of said N/2 electrical data signals inputted to the gearbox IC via the N/2 input terminals of the second electrical interface to produce a respective electrical data signal having a data rate of 2X Gbps and a respective clock signal having a frequency of 2X gigahertz (GHz), each of the N/2 CDR circuits outputting the respective 2X Gbps electrical data signal from an output terminal thereof; and N/2 1-to-2 multiplexers (MUXes), each MUX having an input terminal electrically coupled to the output terminal of one of the N/2 CDR circuits for receiving a respective one of the 2X Gbps electrical data signals outputted from the N/2 CDR circuits, each of the N/2 MUXes deserializing the 2X Gbps electrical data signals into two X Gbps electrical data signals and outputting the two X Gbps electrical data signals via two output terminals of the respective MUX.

7. The gearbox IC of claim 6, wherein the first gearbox IC further comprises:

N de-emphasis drivers, each of the N de-emphasis drivers receiving one of the two X Gbps electrical data signals output from one of the output terminals of a respective one of the MUXes and de-emphasizing and amplifying the respective X Gbps electrical data signal before the X Gbps electrical data signal is output from one of the N output terminals of the first electrical interface of the gearbox IC.

8. The gearbox IC of claim 1, wherein X is approximately equal to 25.

9. The gearbox IC of claim 8, wherein N is equal to or greater than 4.

10. A gearbox integrated circuit (IC) comprising:

a first electrical interface having N input terminals for inputting N binary electrical data signals having a data rate of X gigabits per second (Gbps) and N output terminals for outputting N binary electrical data signals having a data rate of X Gbps, wherein N is a positive integer that is equal to or greater than 2 and X is a positive number that is equal to or greater than 25;

phase-alignment circuitry for phase-aligning pairs of the N inputted binary electrical data signals to produce N/2 pairs of phase-aligned binary electrical data signals;

pulse amplitude modulation (PAM) encoding circuitry that receives the N/2 phase-aligned pairs of binary electrical data signals, encodes each of the N/2 phase-aligned pairs into a respective serial PAM-encoded electrical data signal having a data rate of X Gbps, and outputs N/2 X Gbps serial PAM-encoded electrical data signals;

a second electrical interface having N/2 output terminals and N/2 input terminals, wherein the N/2 X Gbps serial PAM-encoded electrical data signals are outputted from the gearbox IC via the respective N/2 output terminals of the second electrical interface; and PAM decoding circuitry that receives N/2 X Gbps serial PAM-encoded electrical data signals that are inputted to the gearbox IC via the N/2 input terminals, respectively, of the second electrical interface, decodes the inputted N/2 X Gbps serial PAM-encoded electrical data signals into N X Gbps serial binary electrical data signals, and outputs the N X Gbps serial binary electrical data signals from the PAM decoding circuitry, and wherein the N X Gbps serial binary electrical data signals are outputted from the gearbox IC via the N output terminals, respectively, of the first electrical interface.

11. The gearbox IC of claim 10, wherein the phase-alignment circuitry comprises:

N/2 pairs of clock and data recovery (CDR) circuits, each pair of CDR circuits receiving a pair of the N binary electrical data signals inputted to the gearbox IC via the first electrical interface and processing the respective pair of binary electrical data signals to generate first and second clock signals, CLK1 and CLK2, respectively, wherein clock signal CLK1 is aligned with a rising or falling edge of a first one of the binary electrical data signals of the respective pair of the binary electrical data signals and wherein clock signal CLK2 is aligned with a rising or falling edge of a second one of the binary electrical data signals of the respective pair of the binary electrical data signals; and N/2 de-skew circuits, each de-skew circuit using the first and second clock signals CLK1 and CLK2 to phase-align the binary electrical data signals of the respective pair to produce one of the N/2 pairs of phase-aligned binary electrical data signals.

12. The gearbox IC of claim 11, further comprising:

N/2 de-emphasis drivers, each of the N/2 de-emphasis drivers receiving a respective one of the N/2 serial X Gbps PAM-encoded electrical data signals output from the PAM encoding circuitry, each de-emphasis driver de-emphasizing and amplifying the received serial X Gbps PAM-encoded electrical data signal before the respective serial X Gbps PAM-encoded electrical data signal is outputted from the respective output terminal of the second electrical interface of the gearbox IC.

13. The gearbox IC of claim 12, further comprising:

N equalizers, each of the N equalizers equalizing one of the N binary electrical data signals input to the gearbox IC via one of the input terminals of the first electrical interface of the gearbox IC before the respective binary electrical data signal is received by the respective CDR circuit of the respective pair of CDR circuits.

14. The gearbox IC of claim 10, further comprising:

N de-emphasis drivers, each of the N de-emphasis drivers receiving one of the N X Gbps binary electrical data signals output from the PAM decoding circuitry, de-emphasizing and amplifying the respective received X Gbps binary electrical data signal, and causing the respective de-emphasized and amplified X Gbps binary electrical data signal to be output from a respective one of the N output terminals of the first electrical interface of the gearbox IC.

15. The gearbox IC of claim 10, wherein X is approximately equal to 25.

16. The gearbox IC of claim 15, wherein N is equal to 4.

17. A method for performing rate conversion and phase alignment in a gearbox integrated circuit (IC), the method comprising:

in a first electrical interface of the gearbox IC, inputting N electrical data signals having a data rate of X gigabits per second (Gbps) via respective input terminals of a first electrical interface of the gearbox IC, wherein N is a positive integer that is equal to or greater than 2 and X is a positive number that is equal to or greater than 25;

in phase-alignment circuitry of the gearbox IC, phase-aligning pairs of the N inputted electrical data signals to produce N/2 pairs of phase-aligned electrical data signals;

in first rate conversion circuitry of the gearbox IC, receiving the N/2 phase-aligned pairs of electrical data signals from the phase-alignment circuitry and converting each of the N/2 phase-aligned pairs into a respective serialized electrical data signal having a data rate of 2X Gbps;

from a second electrical interface of the gearbox IC, outputting the N/2 serialized 2X Gbps electrical data signals from the gearbox IC via the N/2 respective output terminals of the second electrical interface;

in second rate conversion circuitry of the gearbox IC, receiving N/2 2X Gbps electrical data signals inputted to the gearbox IC via the N/2 respective input terminals of the second electrical interface and converting the N/2 2X Gbps electrical data signals into N X Gbps electrical data signals having a data rate of X Gbps; and outputting the N X Gbps electrical data signals from the gearbox IC via the N output terminals, respectively, of the first electrical interface.

18. The method of claim 17, further comprising:

with N/2 pairs of clock and data recovery (CDR) circuits of the phase-alignment circuitry, receiving N/2 pairs, respectively, of the N X Gbps electrical data signals inputted via the first electrical interface and processing the respective pairs of electrical data signals to generate first and second clock signals, CLK1 and CLK2, respectively, wherein clock signal CLK1 is aligned with a rising or falling edge of a first one of the electrical data signals of the respective pair and wherein clock signal CLK2 is aligned with a rising or falling edge of a second one of the electrical data signals of the respective pair; and with N/2 de-skew circuits of the phase-alignment circuitry, using the first and second clock signals CLK1 and CLK2 to phase-align the respective electrical data signals of the respective pairs to produce the respective phase-aligned pairs of the N electrical data signals.

19. The method of claim 18, further comprising:

with N/2 serializer circuits of the first rate conversion circuitry, receiving the respective N/2 phase-aligned pairs of the electrical data signals and the respective clock signals CLK1 and CLK2 and converting the respective pairs of phase-aligned electrical data signals into the respective serialized 2X Gbps electrical data signal, each serialized 2X Gbps electrical data signal being output from an output terminal of the respective serializer circuit.

20. The method of claim 12, further comprising:

with N/2 de-emphasis drivers of the gearbox IC, receiving respective serialized 2X Gbps electrical data signals output from the output terminals of the respective N/2 serializer circuits and de-emphasizing and amplifying the respective received serialized 2X Gbps electrical data signals before outputting the respective serialized 2X Gbps electrical data signals from the respective output terminals of the second electrical interface of the gearbox IC.

21. The method of claim 20, further comprising:

with N equalizers of the gearbox IC, equalizing the respective N electrical data signals input to the gearbox IC via the respective input terminals of the first electrical interface of the gearbox IC before the respective electrical data signals are received by the respective CDR circuits of the respective pairs of CDR circuits.

22. The method of claim 17, further comprising:

with N/2 CDR circuits of the second rate conversion circuitry, performing clock and data recovery on the respective N/2 electrical data signals inputted to the gearbox IC via the N/2 input terminals of the second electrical interface to produce respective electrical data signals having a data rate of 2X Gbps and respective clock signals having a frequency of 2X gigahertz (GHz), each of the N/2 CDR circuits outputting the respective 2X Gbps electrical data signal from an output terminal thereof; and with N/2 1-to-2 multiplexers (MUXes) of the second rate conversion circuitry, receiving the respective 2X Gbps electrical data signals outputted from the N/2 CDR circuits, deserializing the respective 2X Gbps electrical data signals into respective pairs of X Gbps electrical data signals, and outputting the pairs of X Gbps electrical data signals from the respective MUXes.

23. The method of claim 22, further comprising:
with N de-emphasis drivers of the gearbox IC, receiving the respective X Gbps electrical data signals output from the MUXes and de-emphasizing and amplifying the respective X Gbps electrical data signal before causing the X Gbps electrical data signals to be output from the respective output terminals of the first electrical interface of the gearbox IC.

24. The method of claim 17, wherein X is approximately equal to 25.

25. The method of claim 24, wherein N is equal to 4.

26. A method for performing rate conversion and phase alignment in a gearbox integrated circuit (IC), the method comprising:
in a first electrical interface of the gearbox IC, inputting N electrical data signals having a data rate of X gigabits per second (Gbps) via respective input terminals of a first electrical interface of the gearbox IC, wherein N is a positive integer that is equal to or greater than 2 and X is a positive number that is equal to or greater than 25;
in phase-alignment circuitry of the gearbox IC, phase-aligning pairs of the N inputted electrical data signals to produce N/2 pairs of phase-aligned electrical data signals;
in pulse amplitude modulation (PAM) encoding circuitry of the gearbox IC, receiving the N/2 phase-aligned pairs of binary electrical data signals, encoding each of the N/2 phase-aligned pairs into a respective serial PAM-encoded electrical data signal having a data rate of X Gbps, and outputting N/2 X Gbps serial PAM-encoded electrical data signals from the PAM encoding circuitry;
in a second electrical interface of the gearbox IC, receiving the N/2 X Gbps serial PAM-encoded electrical data signals from the PAM encoding circuitry and outputting the N/2 X Gbps serial PAM-encoded electrical data signals from the gearbox IC via N/2 respective output terminals of the second electrical interface;
in PAM decoding circuitry of the gearbox IC, receiving N/2 X Gbps serial PAM-encoded electrical data signals that are inputted to the gearbox IC via N/2 respective input terminals of the second electrical interface, decoding the inputted N/2 X Gbps serial PAM-encoded electrical data signals into N X Gbps serial binary electrical data signals, and outputting the N X Gbps serial binary electrical data signals from the PAM decoding circuitry; and
in the first electrical interface, outputting the N X Gbps serial binary electrical data signals outputted from PAM decoding circuitry via N respective output terminals of the first electrical interface.

27. The method of claim 26, further comprising:
with N/2 pairs of clock and data recovery (CDR) circuits of the phase-alignment circuitry, receiving N/2 pairs, respectively, of the N X Gbps electrical data signals inputted via the first electrical interface and processing the respective pairs of electrical data signals to generate first and second clock signals, CLK1 and CLK2, respectively, wherein clock signal CLK1 is aligned with a rising or falling edge of a first one of the electrical data signals of the respective pair and wherein clock signal CLK2 is aligned with a rising or falling edge of a second one of the electrical data signals of the respective pair; and
with N/2 de-skew circuits of the phase-alignment circuitry, using the first and second clock signals CLK1 and CLK2 to phase-align the respective electrical data signals of the respective pairs to produce the respective phase-aligned pairs of the N electrical data signals.

28. The method of claim 27, further comprising:
with N equalizers of the gearbox IC, equalizing a respective one of the N binary electrical data signals input to the gearbox IC via one of the input terminals of the first electrical interface of the gearbox IC prior to the respective binary electrical data signal being received by the respective CDR circuit of the respective pair of CDR circuits.

29. The method of claim 28, further comprising:
with N de-emphasis drivers of the gearbox IC, receiving the respective X Gbps binary electrical data signals output from the PAM decoding circuitry, de-emphasizing and amplifying the respective received X Gbps binary electrical data signals, and causing the respective de-emphasized and amplified X Gbps binary electrical data signals to be output from the respective output terminals of the first electrical interface of the gearbox IC.

30. The method of claim 26, wherein X is approximately equal to 25.

31. The method of claim 30, wherein N is equal to 4.

32. An optical communications system for use in an optical fiber link, the optical communications system comprising:
an application specific integrated circuit (ASIC), the ASIC outputting N electrical data signals having a data rate of X gigabits per second (Gbps) from a first set of output terminals of the ASIC, where N is a positive integer that is equal to or greater than 2 and where X is a positive number that is equal to or greater than 25;
a gearbox integrated circuit (IC), the gearbox IC inputting, via a first set of input terminals of the gearbox IC, the N X Gbps electrical data signals outputted from the ASIC, and converting the N electrical data signals into N/2 electrical data signals having a data rate of 2X Gbps, the gearbox IC outputting the N/2 2X Gbps electrical data signals from a first set of output terminals of the gearbox IC; and
an optical transceiver module, the optical transceiver module receiving the N/2 2X Gbps electrical data signals output from the first set of output terminals of the first gearbox IC and causing N/2 electrical-to-optical conversion (EOC) elements to produce N/2 2X Gbps optical data signals corresponding to the N/2 2X Gbps electrical data signals received in the optical transceiver module, and wherein an optics system of the optical transceiver module couples the respective N/2 2X Gbps optical data signals into respective ends of respective optical fibers of a plurality of optical fibers connected to the optical transceiver module.

33. The optical communications system of claim 32, wherein N/2 2X Gbps optical data signals pass out of the ends of respective optical fibers of the plurality of optical fibers and are coupled by the optics system onto the N/2 optical-to-electrical conversion (OEC) elements of the optical transceiver module, respectively, to cause the OEC elements to produce N/2 2X Gbps electrical data signals corresponding to the N/2 2X Gbps optical data signals coupled onto the OEC elements, wherein N/2 amplifiers of the optical transceiver module amplify the N/2 2X Gbps electrical data signals produced by the respective N/2 OEC elements to produce N/2 2X Gbps amplified electrical data signals, and wherein the N/2 2X Gbps amplified electrical data signals are output from N/2 output terminals, respectively, of the optical transceiver module and are input to the first gearbox IC via N/2 input terminals of a second set of input terminals of the gearbox IC, and wherein the gearbox IC converts the N/2 2X Gbps amplified electrical data signals into N X Gbps electrical data signals and outputs the N X Gbps electrical data signals from the gearbox IC via N respective output terminals of a second set of output terminals of the first gearbox IC, and wherein the N X Gbps electrical data signals output via the second set of output terminals of the first gearbox IC are input to the ASIC via a first set of N input terminals of the ASIC.

34. The optical communications system of claim 32, wherein X is approximately equal to 25.

35. The optical communications system of claim 34, wherein N is equal to 4.

36. An optical communications system for use in an optical fiber link, the optical communications system comprising:
   an application specific integrated circuit (ASIC), the ASIC outputting N electrical data signals having a data rate of X gigabits per second (Gbps) from a first set of output terminals of the ASIC, where N is a positive integer that is equal to or greater than 2 and where X is a positive number that is equal to or greater than 25;
   a first gearbox integrated circuit (IC), the first gearbox IC inputting, via a first set of input terminals of the gearbox IC, the N X Gbps electrical data signals outputted from the ASIC and converting the N X Gbps electrical data signals into N/2 X Gbps serial pulse amplitude modulated (PAM)-encoded electrical data signals, the first gearbox IC outputting the N/2 X Gbps serial PAM-encoded electrical data signals from a first set of output terminals of the first gearbox IC; and
   an optical transceiver module, the optical transceiver module receiving the N/2 X Gbps serial PAM-encoded electrical data signals outputted from the first set of output terminals of the first gearbox IC and causing N/2 electrical-to-optical conversion (EOC) elements to produce N/2 X Gbps PAM-encoded optical data signals corresponding to the N/2 X Gbps serial PAM-encoded electrical data signals received in the optical transceiver module, and wherein the optics system couples the respective N/2 X Gbps PAM-encoded optical data signals into respective ends of respective optical fibers of the plurality of optical fibers.

37. The optical communications system of claim 36, wherein N/2 X Gbps PAM-encoded optical data signals pass out of the ends of respective optical fibers of the plurality of optical fibers and are coupled by the optics system onto N/2 optical-to-electrical conversion (OEC) elements of the optical transceiver module, respectively, to cause the OEC elements to produce N/2 X Gbps serial PAM-encoded electrical data signals corresponding to the N/2 X Gbps PAM-encoded optical data signals coupled onto the N/2 OEC elements, respectively, wherein N/2 amplifiers of the optical transceiver module amplify the N/2 X Gbps serial PAM-encoded electrical data signals produced by the N/2 OEC elements to produce N/2 X Gbps amplified PAM-encoded electrical data signals, and wherein the N/2 X Gbps amplified PAM-encoded electrical data signals are output from the optical transceiver module via N/2 output terminals, respectively, of the optical transceiver module and are input to the first gearbox IC via N/2 input terminals of a second set of input terminals of the first gearbox IC, and wherein the gearbox IC converts the N/2 X Gbps amplified PAM-encoded electrical data signals into N X Gbps binary electrical data signals and outputs the N X Gbps binary electrical data signals from the gearbox IC via N respective output terminals of a second set of output terminals of the gearbox IC, and wherein the N X Gbps binary electrical data signals output via the second set of output terminals of the gearbox IC are input to the ASIC via a first set of N input terminals of the ASIC.

38. The optical communications system of claim 36, wherein X is approximately equal to 25.

39. The optical communications system of claim 38, wherein N is equal to 4.

40. A method for communicating over an optical fiber link, the method comprising:
   outputting N electrical data signals having a data rate of X gigabits per second (Gbps) from a first set of output terminals of an application specific integrated circuit (ASIC), where N is a positive integer that is equal to or greater than 2 and where X is a positive number that is equal to or greater than 25;
   inputting, via a first set of input terminals of the gearbox integrated circuit (IC), the N X Gbps electrical data signals outputted from the ASIC and converting the N X Gbps electrical data signals into N/2 2X Gbps electrical data signals;
   outputting, via a first set of output terminals of the gearbox IC, the N/2 2X Gbps electrical data signals from the gearbox IC;
   inputting into the optical transceiver module, via a first set of input terminals of an optical transceiver module, the N/2 2X Gbps electrical data signals output from the gearbox IC;
   with N/2 electrical-to-optical conversion (EOC) elements of the optical transceiver module, converting the inputted N/2 2X Gbps electrical data signals into N/2 2X Gbps optical data signals, respectively; and
   with an optics system of the optical transceiver module, coupling the respective N/2 2X Gbps optical data signals into respective ends of respective optical fibers of a plurality of optical fibers connected to the optical transceiver module.

41. The method of claim 40, further comprising:
   with the optics system of the optical transceiver module, coupling N/2 2X Gbps optical data signals passing out of ends of respective optical fibers of the plurality of optical fibers onto N/2 optical-to-electrical conversion (OEC) elements of the optical transceiver module;
   with the N/2 OEC elements, producing N/2 2X Gbps electrical data signals corresponding to the N/2 2X Gbps optical data signals coupled onto the respective N/2 OEC elements;
   with N/2 amplifiers of the optical transceiver module, amplifying the N/2 2X Gbps electrical data signals produced by the N/2 OEC elements, respectively, to produce N/2 2X Gbps amplified electrical data signals, wherein the N/2 2X Gbps amplified electrical data signals are output from N/2 output terminals, respectively, of the optical transceiver module and are input to the first gearbox IC via N/2 input terminals of a second set of input terminals of the first gearbox IC;
   in the gearbox IC, converting the N/2 2X Gbps amplified electrical data signals into N X Gbps electrical data signals and outputting the N X Gbps electrical data signals from the gearbox IC via N respective output terminals of a second set of output terminals of the gearbox IC; and
   in the ASIC, inputting, via a first set of N input terminals of the ASIC, the N X Gbps electrical data signals output from the gearbox IC via the second set of output terminals of the gearbox IC.

42. A method for communicating over an optical fiber link, the method comprising:

outputting N electrical data signals having a data rate of X gigabits per second (Gbps) from a first set of output terminals of an application specific integrated circuit (ASIC), where N is a positive integer that is equal to or greater than 2 and where X is a positive number that is equal to or greater than 25;

inputting, via a first set of input terminals of a gearbox integrated circuit (IC), the N X Gbps electrical data signals outputted from the ASIC and converting the N X Gbps electrical data signals into N/2 pulse amplitude modulated (PAM)-encoded electrical data signals having a data rate of X Gbps;

outputting, via a first set of output terminals of the gearbox IC, the N/2 X Gbps PAM-encoded electrical data signals from the gearbox IC;

inputting into an optical transceiver module, via a first set of input terminals of the optical transceiver module, the N/2 X Gbps PAM-encoded electrical data signals output from the gearbox IC;

with N/2 electrical-to-optical conversion (EOC) elements of the optical transceiver module, converting the inputted N/2 X Gbps PAM-encoded electrical data signals into N/2 X Gbps PAM-encoded optical data signals, respectively; and with an optics system of the optical transceiver module, coupling the N/2 X Gbps PAM-encoded optical data signals into respective ends of respective optical fibers of a plurality of optical fibers connected to the optical transceiver module.

43. The method of claim 42, further comprising:

with the optics system of the optical transceiver module, coupling N/2 X Gbps PAM-encoded optical data signals passing out of ends of respective optical fibers of the plurality of optical fibers onto N/2 optical-to-electrical conversion (OEC) elements of the optical transceiver module;

with the N/2 OEC elements, producing N/2 X Gbps PAM-encoded electrical data signals corresponding to the N/2 X Gbps PAM-encoded optical data signals coupled onto the respective N/2 OEC elements;

with N/2 amplifiers of the optical transceiver module, amplifying the N/2 X Gbps PAM-encoded electrical data signals produced by the respective N/2 OEC elements to produce N/2 X Gbps amplified PAM-encoded electrical data signals, and wherein the N/2 X Gbps amplified PAM-encoded electrical data signals are output from N/2 output terminals, respectively, of the optical transceiver module and are input to the gearbox IC via N/2 input terminals of a second set of input terminals of the gearbox IC;

in the gearbox IC, converting the N/2 X Gbps amplified PAM-encoded electrical data signals into N X Gbps binary electrical data signals and outputting the N X Gbps binary electrical data signals from the gearbox IC via N respective output terminals of a second set of output terminals of the gearbox IC; and in the ASIC, inputting, via a first set of N input terminals of the ASIC, the N X Gbps binary electrical data signals output from the gearbox IC via the second set of output terminals of the gearbox IC.

* * * * *